United States Patent [19]

Rayfield et al.

[11] 4,197,797

[45] Apr. 15, 1980

[54] MODULAR HIGH SPEED PRINTING SYSTEM

[75] Inventors: Wilson P. Rayfield, Longwood, Fla.; Norman H. Preston, Rochester, N.Y.; Ronald W. Ferguson, Rochester, N.Y.; Frederick H. Dear, Rochester, N.Y.; Henry M. Korytkowski, Rochester, N.Y.; Frank L. Muster, Rochester, N.Y.; Ward L. Karns, Haynesboro, Va.

[73] Assignee: Burroughs Corporation, Detroit, Mich.

[21] Appl. No.: 844,520

[22] Filed: Oct. 21, 1977

[51] Int. Cl.² .................................................. B41J 11/18
[52] U.S. Cl. .............................................. 101/90; 101/66; 101/235; 271/265
[58] Field of Search ............................. 101/66–70, 101/78, 90, 287, 297, 316, 317, 235, 240–242, 93.41, 93.42; 235/61.9 R; 271/10, 109, 227, 236, 265, 270, 272

[56] References Cited

U.S. PATENT DOCUMENTS

| | | | |
|---|---|---|---|
| 1,960,948 | 5/1934 | Long | 101/67 |
| 3,048,099 | 8/1962 | Davidson et al. | 101/90 X |
| 3,340,801 | 9/1967 | Shorp | 101/90 |
| 3,342,126 | 9/1967 | Nesin et al. | 101/90 |
| 3,343,482 | 9/1967 | Scott et al. | 101/90 |
| 3,415,182 | 12/1968 | White | 101/90 X |
| 3,804,007 | 4/1974 | Arciprite et al. | 101/90 X |
| 3,895,574 | 7/1975 | Nyborg | 101/240 X |
| 4,027,142 | 5/1977 | Paup et al. | 235/61.9 R |
| 4,040,345 | 8/1977 | Adams et al. | 101/66 |
| 4,054,092 | 10/1977 | Lofts et al. | 101/242 |

OTHER PUBLICATIONS

Croll et al., IBM Tech. Discl. Bulletin, vol. 14, No. 12, 5/72, p. 3757.

*Primary Examiner*—Edward M. Coven
*Attorney, Agent, or Firm*—Kevin R. Peterson; Edward J. Feeney, Jr.; Gerald J. Woloson

[57] ABSTRACT

A modular high speed printing system for printing alphabetic and numerical information upon individual items or documents fed individually or in series through the modules. A feeder module performs accounting functions as to the number of documents processed, provides multiple or single mode document feeding and is adjustable to accommodate different size documents. The system also includes one or more printing modules for printing machine readable repetitive data, machine readable consecutive data, repetitive alphanumeric information and consecutive numeric information. A document receiver module adjustable to different size forms is also provided. The printing modules employ common document drive systems including an adjustable document end stop to permit horizontal placement of the information on the document. Vertical positioning of the information on the document is accomplished by means of adjusting the print mechanisms. The individual modules can be selected for operation in active or bypass modes and single cycle or flow feeding modes.

14 Claims, 44 Drawing Figures

33

JOHN Q. CUSTOMER
000 ELM AVE.
ANYTOWN, STATE 11111

100

19____

PAY TO
THE ORDER OF_____ $_____

_____ DOLLARS (YOUR BANK)

⑇0560⑇0111⑇ 0⑇51 33 556⑇        100

35                                        37

---

CHECKING ACCOUNT DEPOSIT TICKET

JOHN Q. CUSTOMER
41 — 000 ELM AVE.
ANYTOWN, STATE 11111

DATE_____ 19____

| CASH | | |
|---|---|---|
| LIST CHECKS ONLY | | |
| | | |
| | | |
| TOTAL FROM OTHER SIDE | | |
| TOTAL | | |
| LESS CASH RECEIVED | | |
| TOTAL ITEMS / NET DEPOSIT | | |

39

(YOUR BANK)

⑇0560⑇0111⑇ 0⑇51 33 556⑇
43                                45

---

| CODE | ACCT. NO. | NAME 51 | 49 TERM | PAYMENT NO. 47 |
|---|---|---|---|---|
| 53 — 01 | 999999 | CUSTOMER, JOHN Q. | 24 | 01 |

GROSS PAYMENT                              NET PAYMENT
AFTER THIS DATE  PAY THIS AMT. 55       DUE DATE   IN AMOUNT OF 55

JAN 01 77 | 53.52 |                    DEC 21 77 | 50 | 98 |

MAIL OR BRING  (YOUR BANK)                        BALANCE  254.90
PAYMENT TO 056111              3351550         06
              57

*FIG. 1b*

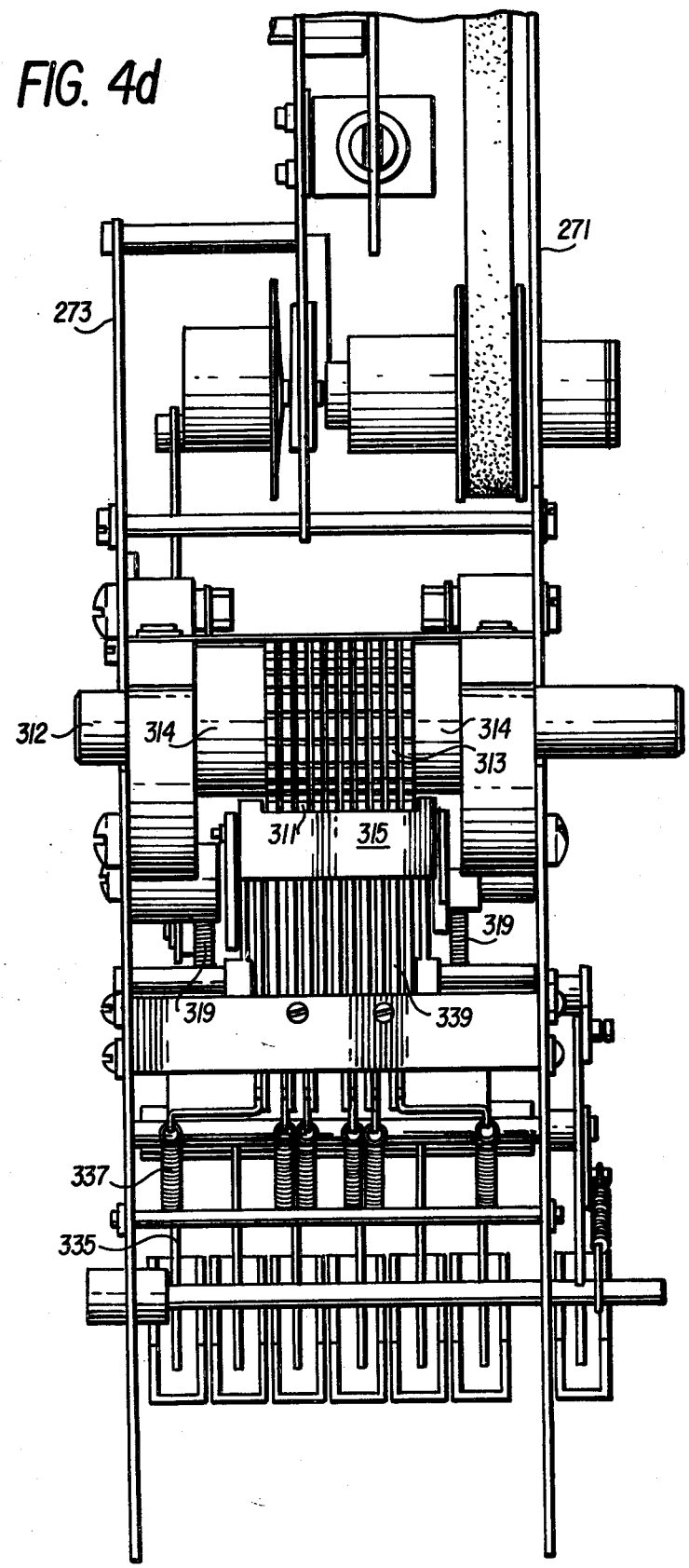

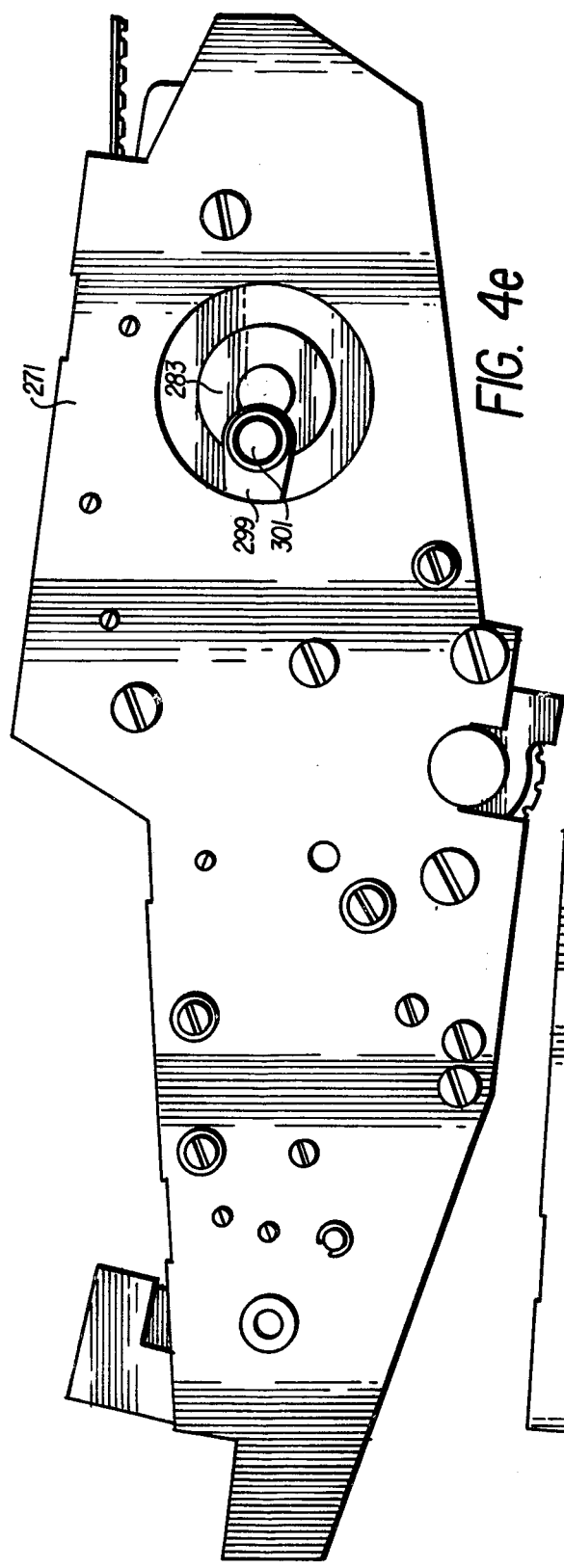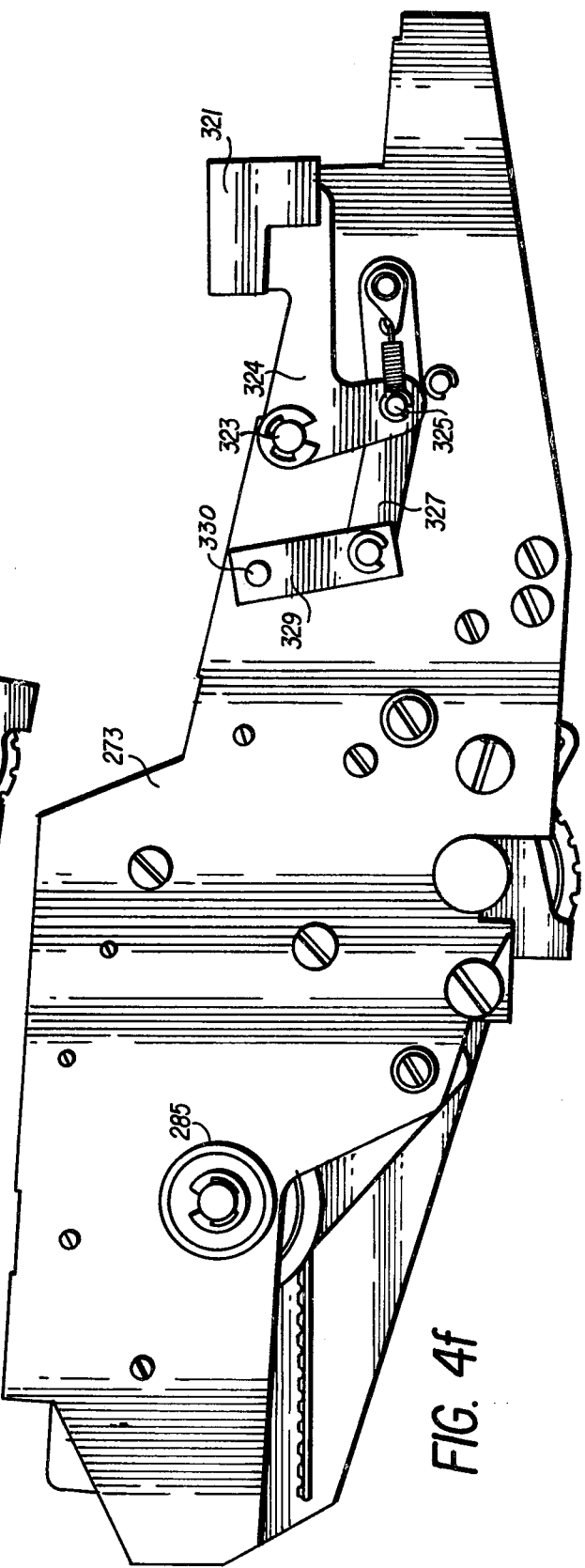
FIG. 4e
FIG. 4f

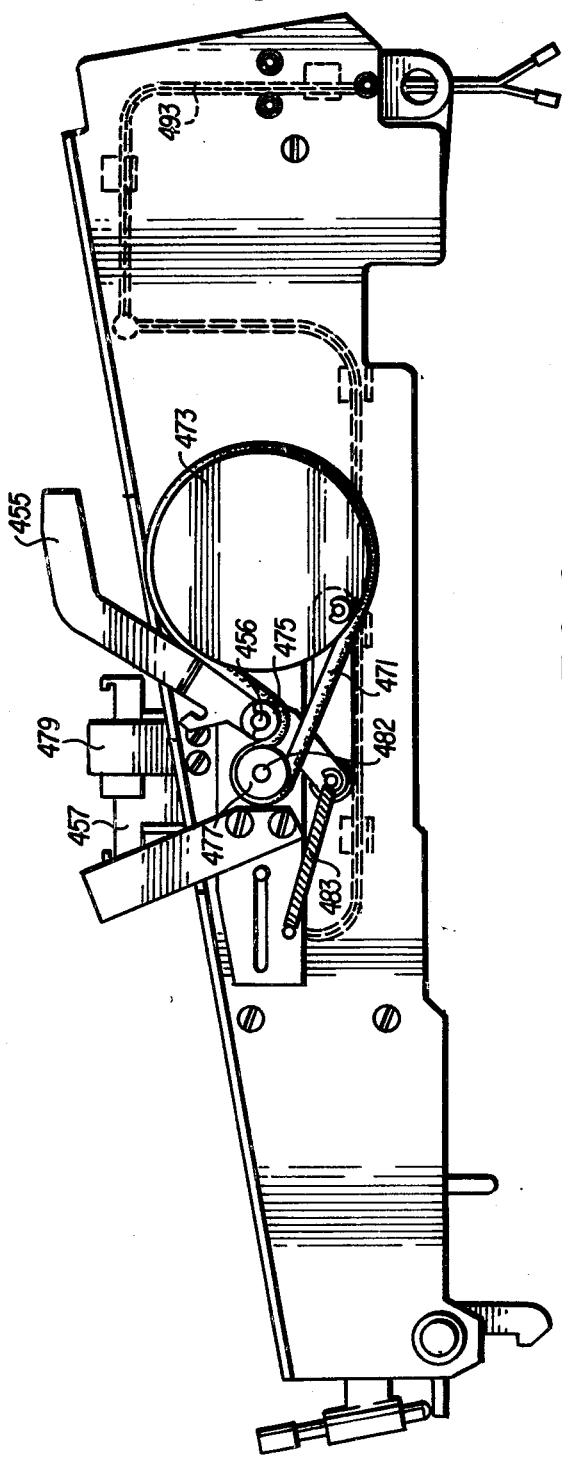
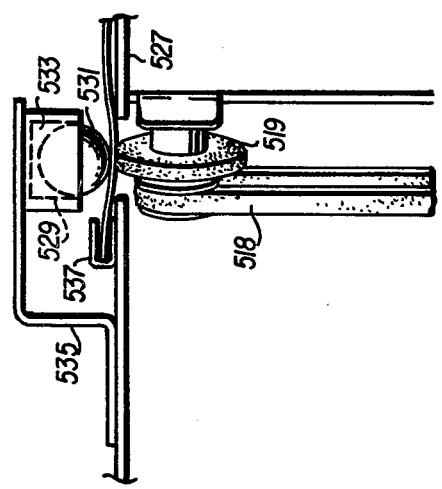
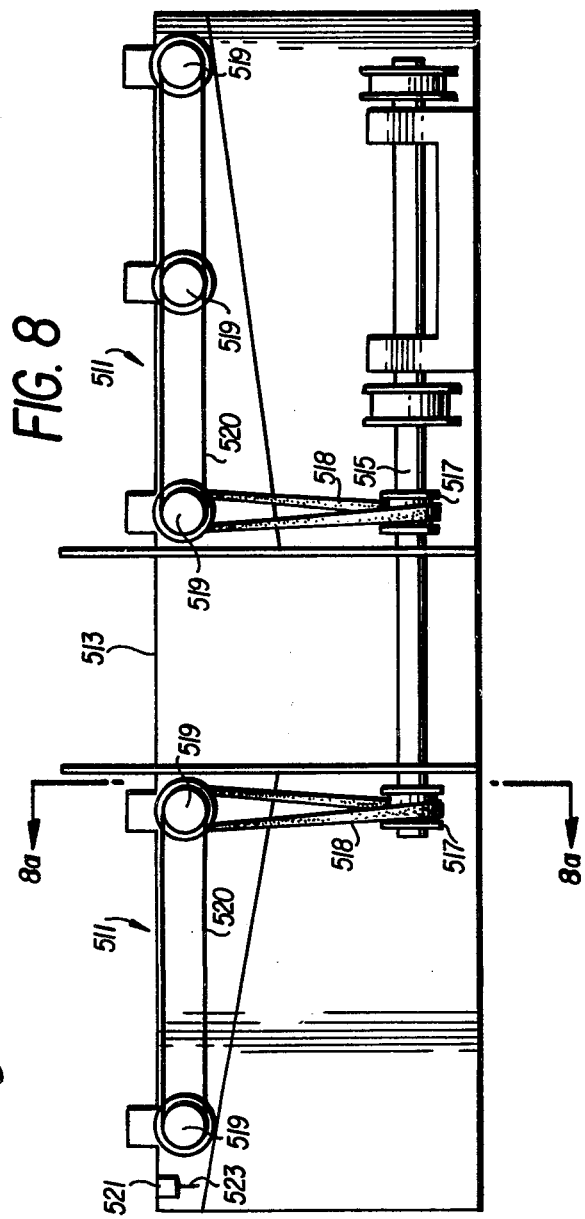

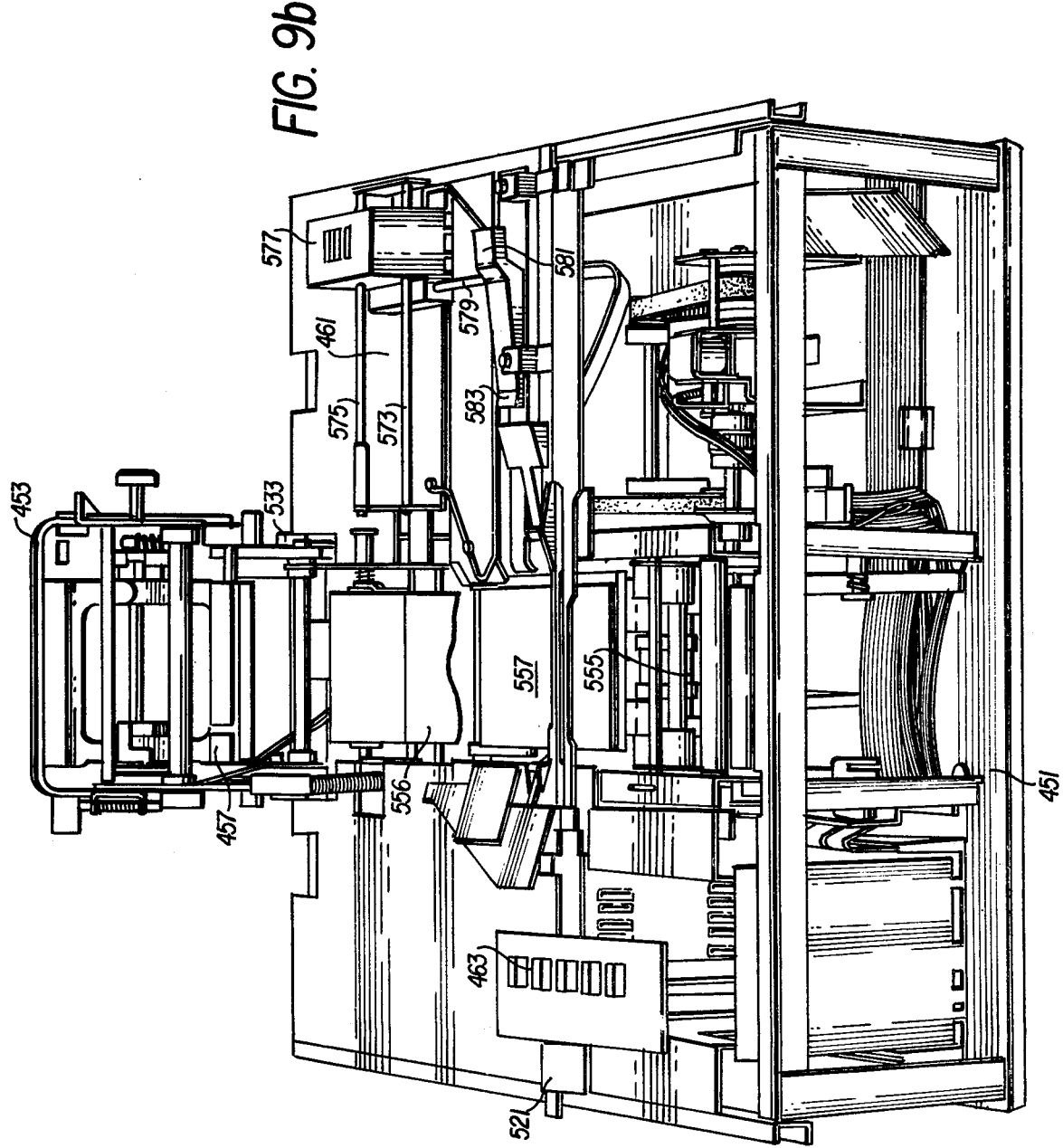

MODULAR HIGH SPEED PRINTING SYSTEM

FIELD OF THE INVENTION

The invention relates to a system for the printing of fixed and variable information in both human and machine readable form in selected printing fields on documents.

BACKGROUND OF THE INVENTION

The banking industry has utilized an ever increasing number of forms which while containing significant amounts of repetitive and common information also require specialized or personalized information to be printed thereon. Besides a need for the ability to print fixed and variable information on documents, it is found to be highly advantageous to print certain informational fields in machine readable form. To this end, special character fonts and recording techniques have been developed which include Magnetic Ink Character Recognition (MICR) and Optical Character Recognition (OCR) recording techniques. Although there has been a need to print repetitive variable information in multiple fields on the face of documents, prior art machines have at most exhibited the capability to print one or possibly two fields in selected positions. An example of a machine for printing signatures and/or dates on documents is found in U.S. Pat. No. 4,037,535, entitled High Speed Printing Apparatus and assigned to the common assignee of this invention. While this and similar prior art printers are suitable for their intended applications they are not capable of printing a large number of fields on the documents in a single pass. The necessity for multiple passes, of course, reduces the speed of document processing and requires more operator attention. This has made the assembly and customizing of documents which are used in large quantities an expensive and time consuming undertaking.

Besides the reduced cost effectiveness of many prior art machines these devices have proved to be inflexible with respect to the location of printing. Not only are there constraints upon the size and shape of the documents employed, but adjusting the devices to print at different selected locations on the documents is often time consuming. Also, there are significant areas on the check which cannot be selected for printing.

In addition to the desirability of printing documents at high speeds and with maximum flexibility, the processing needs of banks, for example, often require that multiple types of documents be assembled into one book or lift. As an example, the commonly used checkbook includes not only the drawer's checks but also deposit slips by which the drawer can make deposits. Similarly, an installment loan booklet will include payment coupons and summary statement or advertising documents. It can be seen that it would be highly advantageous to be able to prepare all the documents which are to be assembled into a particular book or lift at the same time. An apparatus most suitable for such an application would have the capability of printing all the different documents within a book or lift in one pass and would also require little operator attention.

SUMMARY OF THE INVENTION

It is an object of this invention to provide a modular printing system for printing both machine readable and human intelligible indicia.

It is another object of this invention to provide a modular printing system for printing both repetitive and nonrepetitive information.

It is another object of this invention to provide a modular printing system which is capable of printing on documents presented in either a flow mode or a single cycle mode.

A further object of this invention is to provide a modular printing system which includes a feeder module with means to accommodate different size forms.

It is another object of this invention to provide a modular printing system with a feeder module which has a first feed path for normal feeding of documents in flow mode and a second document feed path for feeding random documents into the printing system.

It is still another object of this invention to provide a modular printing system wherein each of the print modules can operate in either an active or a bypass mode.

Another object of this invention is to provide a modular printing system wherein a uniform document transport system is employed within each module.

Still another object of this invention is to provide a modular printing system which includes a plurality of different functional printing modules which may be arranged in any order.

It is an object of this invention to provide a modular printing system wherein each printing module includes an end stop to position the printing horizontally on the documents.

It is still another object of this invention to provide a modular printing system which includes an alphanumeric printing module with an alphanumeric printing plate holder capable of holding a plurality of printing plates at one time.

It is another object of this invention to provide a modular printing system which includes a consecutive numeric printing module with means to vertically position the printing on the face of the documents.

It is another object of this invention to provide a modular printing system for printing documents in different formats during a single pass.

These and other objects are accomplished by a modular printing system which includes a feeder module and one or more printing modules. The printing modules may perform selectable printing operations on documents fed from the feeder module into a document transport system. The printing system can operate in either document flow mode or single cycle mode and the system is capable of handling documents of different widths and lengths. Each printing module includes an end stop positioner for establishing the horizontal locus of printing on the documents and each printing module can operate in either an active or a bypass mode. The printing system includes apparatus for printing in both machine readable and human intelligible symbols and can print upon different types of documents in different formats during a single pass of the document through the system and without the need for changes in the system.

The novel features which are believed to be characteristic of this invention are set forth with particularity in the appended claims. The invention itself, however, both as its organization and method of operation, together with further objects and advantages thereof, may best be understood with reference to the following description taken in connection with the accompanying drawings.

BRIEF DESCRIPTION OF THE DRAWINGS

FIGS. 1a and 1b show a perspective view of the modular printing system of the present invention as well as examples of documents printed by the modular printing system.

FIGS. 4a-4f show the consecutive MICR print head employed in a printing module of the present invention.

FIGS. 6a-6e show the repetitive alphanumeric print head employed in a printing module of this invention.

FIG. 8-8a show the document transport apparatus employed within each printing module to convey documents through the module.

FIGS. 9a-9d show the base units for the printing modules of the present invention.

DESCRIPTION OF THE PREFERRED EMBODIMENT

Figure 1A:
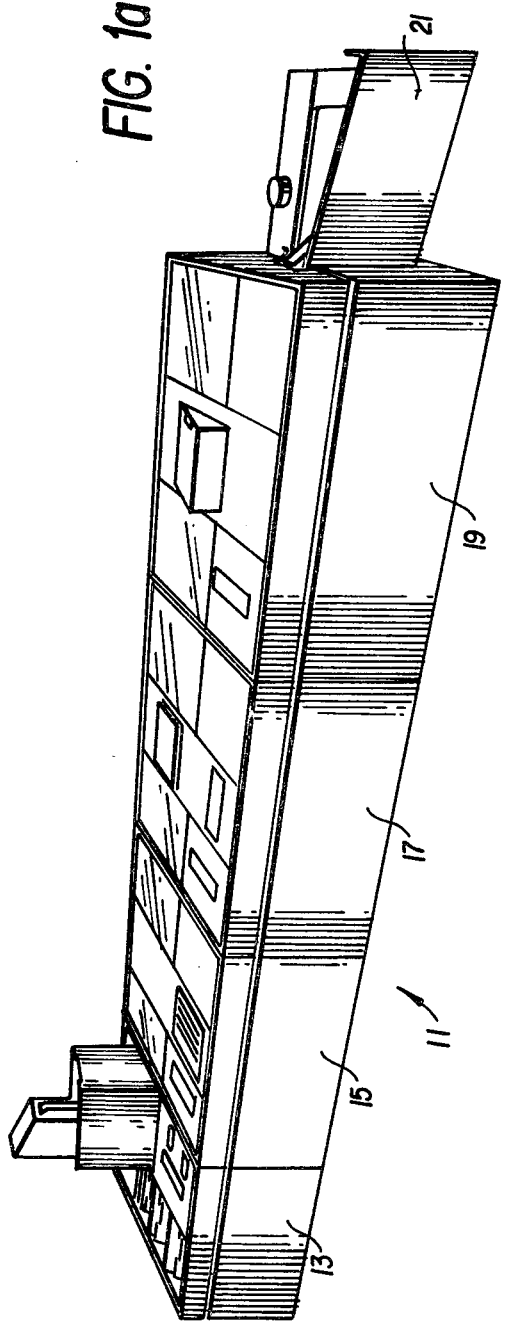

FIG. 1a is a perspective view of the modular printing system of the present invention. A feeder plus three printing module system 11 is depicted with module 13 being the feeder moudle, module 15 being a repetitive MICR printing module, module 17 being a sequential MICR printing module, module 19 being a repetitive alphanumeric printing module and module 21 being the document receiver. It is important to note at the outset of this description that when a printing module is described as printing in MICR mode, in essence it is printing characters which are readable by machines. It will be equally expedient and is indeed comprehended by this invention to include OCR and CMC 7 printing.

It will help to understand the modular printing system of the instant invention if some exemplary documents are shown which are most advantageously printed by the instant invention. FIG. 1b shows three documents which should be familiar to the reader. They are standard banking documents wherein one document is a conventional bank check, another document is a deposit ticket and the third document is an installment loan coupon. In the conventional bank check four informational fields have been identified which will vary between customers and within the documents used by a single customer. Field 31 is the check number which normally is an incremental number with the checks being packaged in packets of 25. Field 33 is the customer identification field and includes alphanumeric information specifically related to a specific customer. Field 37 is an optional printing field which the bank may desire to correspond to the check number in a machine readable font. This field 37 is along the line which is scanned by conventional document reader sorters for machine readable information. The use of field 37 could be to provide a machine readable representation of the check number so that the checks for an individual customer could be sorted into their proper numercial sequence before return. Field 35 includes machine readable representation of a customer's account number as well as check processing information such as the routing and transit fields. The second document depicted in FIG. 1b is a deposit ticket. A shaded area 39 is called the black spot and is used to identify the document as the deposit ticket. Again, we have the customer related alphanumeric field 41 and machine readable account information 43. The third document shown in FIG. 1b is an installment loan payment coupon containing constant value numeric fields 49, 53, and 55, a consecutively incremented numeric field 47 and a specialized alphanumeric field 51. Also included is a machine readable field 57 which may include both repetitive information and consecutively incremented information.

The documents shown in FIG. 1b exhibit the different functions which it would be advantageous to have a modular printing system perform. The modules could be concatenated to form an integrated printing machine wherein each printing module would print the correct information in the proper location on the document. To perform these proper printing operations in an automatic manner there is employed a document feeder, a plurality of printing modules connectable with the feeder and adapted to print preselected information in corresponding preselected fields on the documents, a document transport system for conveying the documents from the feeder through the printing modules to a printed document receiver. Appropriate control devices are provided as necessary to monitor the printing and transporting of documents.

THE FEEDER MODULE

Figure 2A:
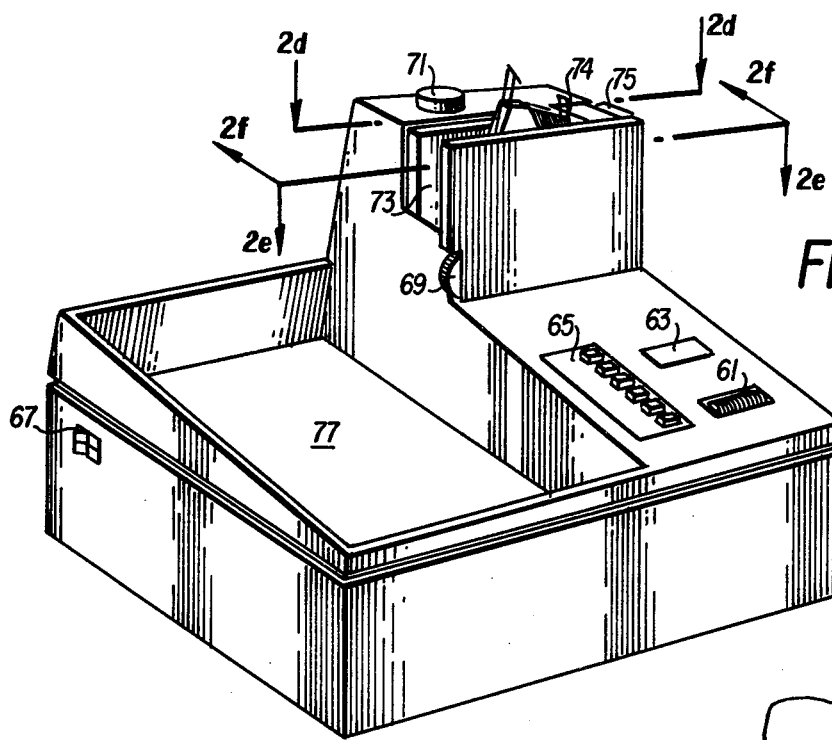
FIGS. 2a-2g show views of the feeder module employed in the present invention.
Figure 2B:
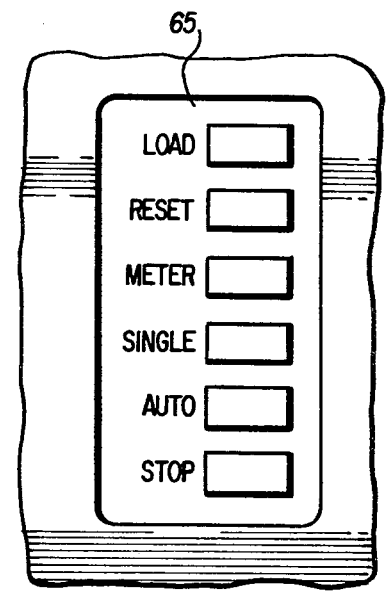

FIG. 2a shows a close-up of a feeder module 13 employed within the modular printing system. The feeder module 13 includes a run selector dial 61 which permits the operator to instruct the system as to the specifics of the job being executed. Normally, a job will include one or more lifts or groupings of documents with a predetermined number of documents in each lift. The run selector dial 61 is connected to feeder control system (not shown in this figure) to provide the feeder control with the necessary run instructions. The run selector dial 61 includes a plurality of thumbwheel or other switches whereby the operator can enter the number of sets or lifts of documents to be processed as well as the number of documents per lift. It is believed to be within the ability of one skilled in the art to establish the necessary registers and counters within the system control to implement the run selector mechanism. The feeder module 13 also includes a meter 63 which is primarily for billing purposes and accumulates and displays the number of documents which have been fed by the module. A control panel 65 includes further run instruction buttons for the feeder module. The feeder module includes a power ON/OFF switch 67 which controls power to the entire printer system. A ply selector dial 69 is included to adjust the feeder for the thickness of the documents being processed. Form adjuster knob 71 is provided to enable the feeder module to accommodate different width forms. The forms are put in form hopper 73, and some forms are shown as 74 in FIG. 2a. A random document feeder slot 75 is provided to enable documents to be fed individually by the feeder module without disturbing or requiring the removal of the forms put in the forms hopper 73. Finally, as a matter of convenience for the operator, a form's holder area 77 is provided to hold forms waiting to be processed. FIG. 2b is an enlargement of the control panel 65 and shows the different operating modes and control buttons which are provided to operate with the modules as well as the feeder module. The control panel 65 is operatively connected to the feeder control system. The load mode means the module is ready to process documents. The reset button is provided to clear any abnormal conditions in the module and ready it for the load mode. The single button instructs the module to feed a single document at a time whereas the auto button places the module into flow mode which in the case of the feeder results in a stream of documents being fed into the document transport system at regular intervals. The stop button is provided to enable an operator to stop the processing and depressing the stop button in any module results in the entire printing system coming to a halt. The meter button is employed to display the count on meter 63.

Figure 2G:
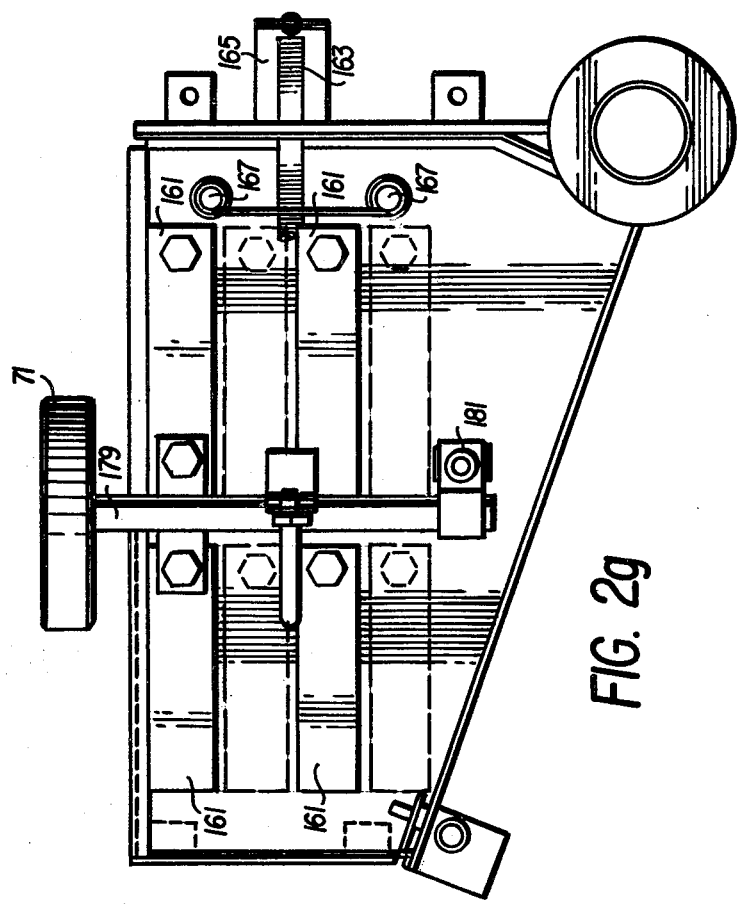
Figure 2C:
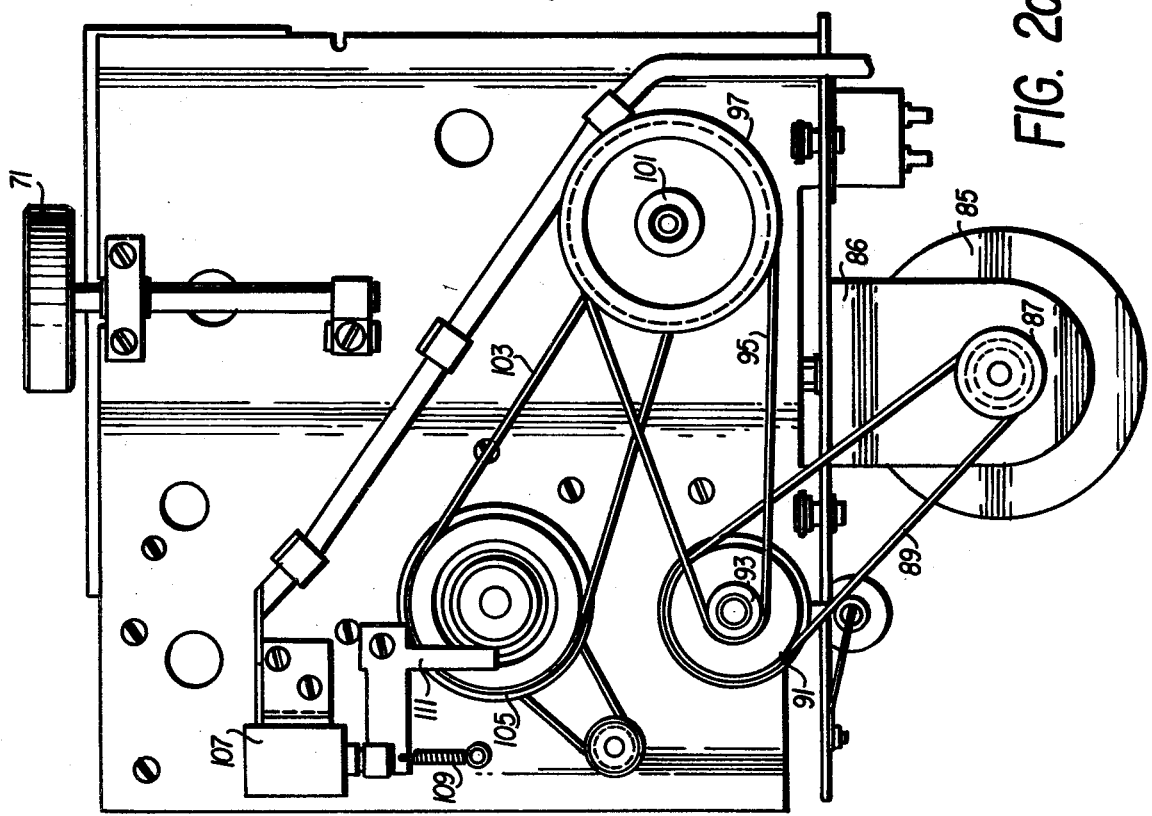

FIG. 2c is a view of the rear of the feeder module of FIG. 2a with the back cover removed. FIG. 2c shows the motor driving the feeder module. The motor 85 mounted on mount 86 is an induction motor rated at approximately 1800 RPM. Running from pulley 87 on motor 85 is a belt 89 which is connected to pulley 91 which drives a high speed feed wheel 129 (FIG. 2d). Belt 95 runs from the small pulley 93 on the high speed drive pulley 91 to the intermediate pulley 97. From pulley 101 belt 103 runs to pulley 105 which drives a low speed feed wheel. Solenoid 107 acting in opposition to spring 109 and in conjunction with clutch shaft 111 is employed to start the feed system when a random document is placed in the random document chute or to start document feeding when either the single or auto feed mode switches have been depressed.

FIG. 2d is a cross sectional view of the feeder module 13 taken along lines 2d–2d, and is a rear view thereof. FIG. 2d shows the drive rollers for feeding documents from either the document hopper 73 or the random document chute 75. Normally documents are fed from the document hopper 73 where they are vertically stacked with their lower edge abutting the slanted wall 74 of the document hopper. Guide member 121 is provided to guide the lead document toward the low speed feed roller 123. The low speed feed roller is driven off of pulley 105 as shown in FIG. 2c and rotates at a speed of approximately 90 RPM. The low speed feed roller 123 has a surface characteristic which grips without tearing the face of the lead document presented in the document hopper 73. Engagement of the low speed feed roller 123 with the face of the document causes the document to be urged into the document feed path 127 at the beginning of exit area 138. Alternatively, documents may be fed singly through the random document chute 75 where they travel down guide channel 125 without making contact with the low speed drive roller 123. A special drive roller discussed in connection with FIG. 2f urges a document inserted into the random document chute 75 toward the document feed path 127. A high speed feed roller driven by pulley 91 (FIG. 2c) at approximately 900 RPM is located opposite the double document detector roller 131. The space between the high speed roller 129 and the double document detector roller 131 is the document feed path 127. The double document detector roller 131 operates in connection with sensor 135 to determine if multiple overlapped documents are in the document feed path 127 at the same time. If such a condition exists sensor 135 signals the system control to indicate a jam condition and halt feeding. Assuming a single document has entered the document feed path 127 the high speed feed roller 129 grips the face of the document and accelerates the document past guide member 137 and into the document transport system of the printer modules.

Figure 2E:
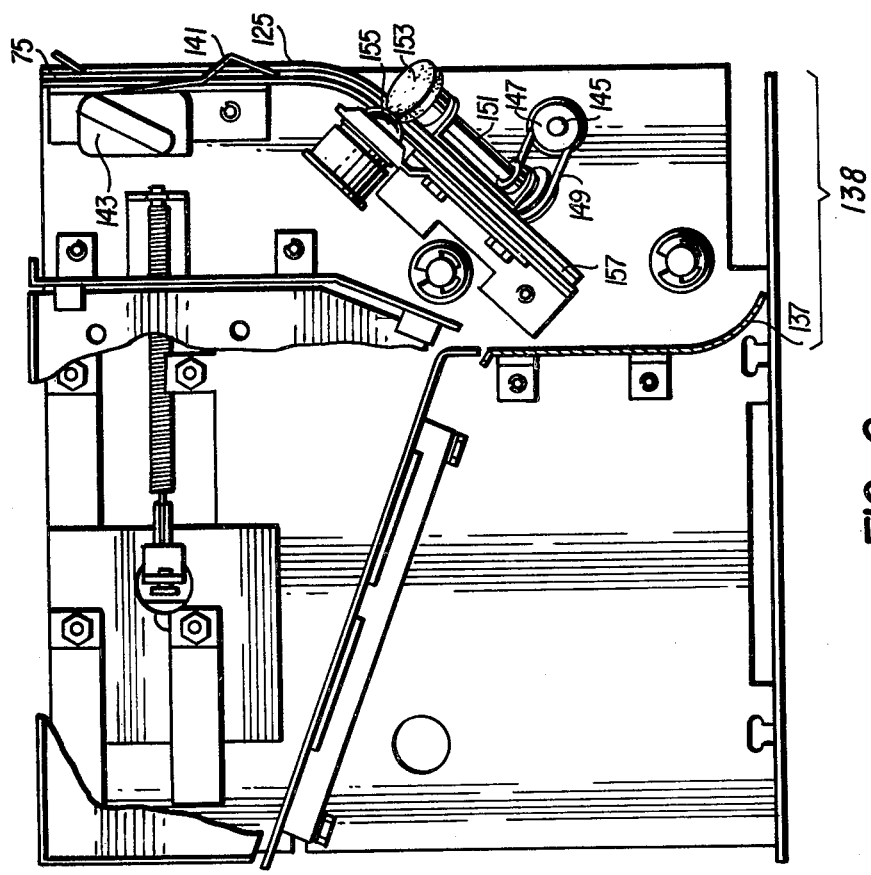
Figure 2D:
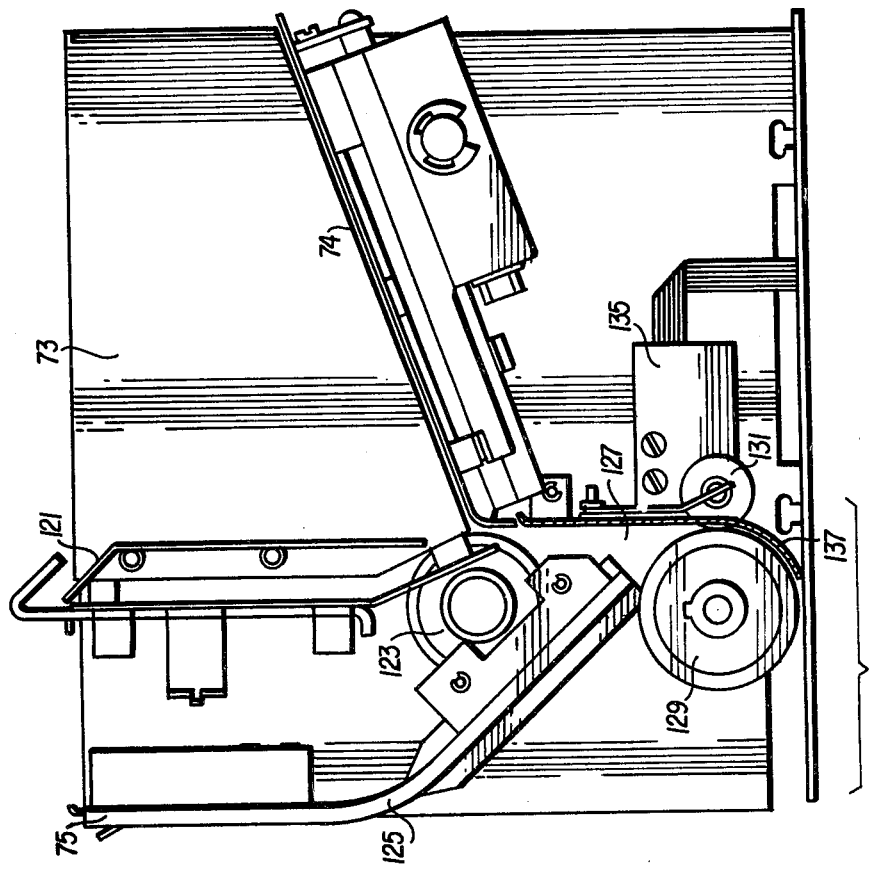

FIG. 2e is a cross sectional view of the feed module 13 taken along lines 2e–2e and shows in detail the structure of the random document chute 75. The random document chute 75 feeds into document channel guide 125. A pivot arm 141 connected to micro switch 143 is employed to actuate a suitable drive motor not shown upon the insertion of a document into the random document chute 75. The drive motor acts through drive pulley 145, belt 147 and intermediate pulley 149 to rotatably drive shaft 151 and canted document feed roller 153. The document feed roller 153 is angularly related to the document guide channel 125 of the random document chute 75 such that a document that enters the document chute 75 in a skewed orientation is automatically aligned against one edge of the random document chute by the canted document feed roller 153. Presser roller 155 opposes the canted document feed roller 153 to enhance the gripping of the feed roll with any document inserted therebetween. A document which is accelerated by the canted feed roller 153 moves through the document feed path 157, into exit area 138 and out past document guide member 137 to the successive printer modules.

Figure 2F:
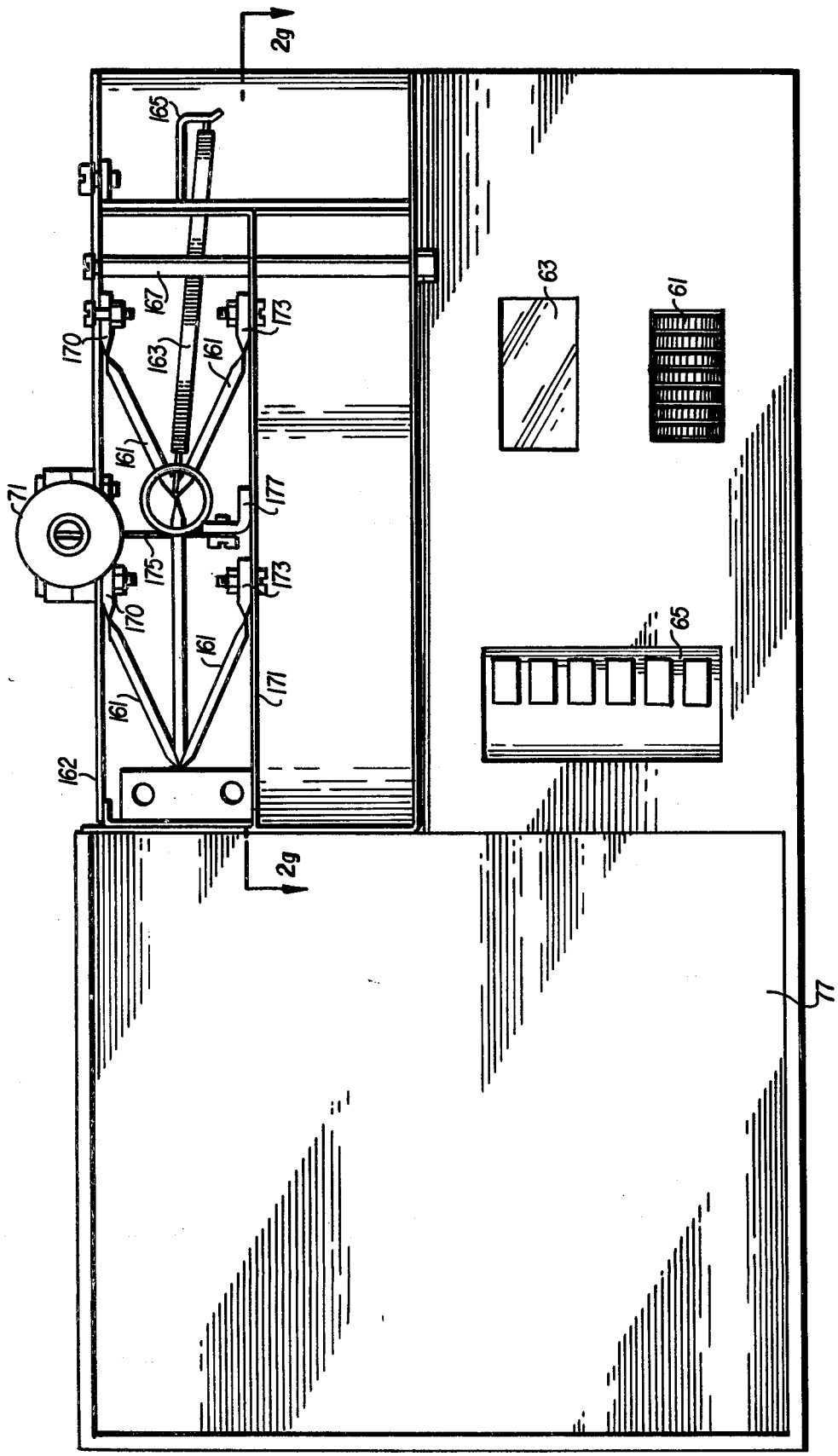

FIG. 2f is a cross sectional view of the feeder module shown in FIG. 2a taken along lines 2f–2f and shows the specifics of the mechanism for adjusting the feeder to accommodate forms of various widths. Adjuster knob 71 is rotatable to either expand or contract a parallelogram hinge formed from members 161 which are attached to the fixed wall 162 of the feeder module at points 170 and attached to the movable wall 171 of the hopper at connections 173. A spring 163 connected at one end to fixed mounting 165 and at the other end to the parallelogram hinge is tensioned to urge the parallelogram hinge into its fully expanded position. Cord 175 connected at fixed mounting 177 on the movable wall 171 of the hopper and at the other end to the shaft of the rotatable knob 71 acts in opposition to the force of the spring 163. Rotation of the knob 71 in one direction wraps the cord 175 about the shaft of the knob 71 and draws the movable wall 171 of the hopper toward the fixed wall 162 of the feeder. When the knob 71 is turned in the opposite direction the cord 175 is fed from the shaft of the knob 71 and the tension of the spring 163 causes the parallelogram hinge to expand and the movable wall 171 of the forms hopper to move in a direction away from the control knob to decrease the width of the forms hopper 73.

FIG. 2g is a cross sectional view of the parallelogram hinge shown in FIG. 2f taken along lines 2g–2g. Again, the adjustment knob 71 with its supporting shaft 179 is clearly shown. The members of the parallelogram hinge 161 are also evident. The spring 163 and spring holder 165 can be seen in FIG. 2g. Two guide rods 167 are also shown in cross section and are employed to support and guide one end of the movable wall 171 of the document hopper 73.

THE PRINTING MODULES

As was previously discussed, the printing system comprises the feeder module and one or more printing modules. An in depth discussion of each of the printing modules will follow with the understanding that any documents which are printed by the printing modules have been previously fed by the feeder module. As further general explanation of the printing modules it should be understood that the system can accommodate a varying number of printing modules in any desired sequence between the feeder and the document receiver. Multiple units of the same type of printing module can be included within a printing system. Each printing module as will hereinafter be described comprises a print head, a base portion including a printing platen and a document transport system for conveying documents from the previous module (either another printing module or the feeder) to the subsequent module (again, either another printing module or the document receiver). The base portions and document transport systems within each module are of similar construction with the primary differences between the printing modules residing in the print heads.

Figure 3A:
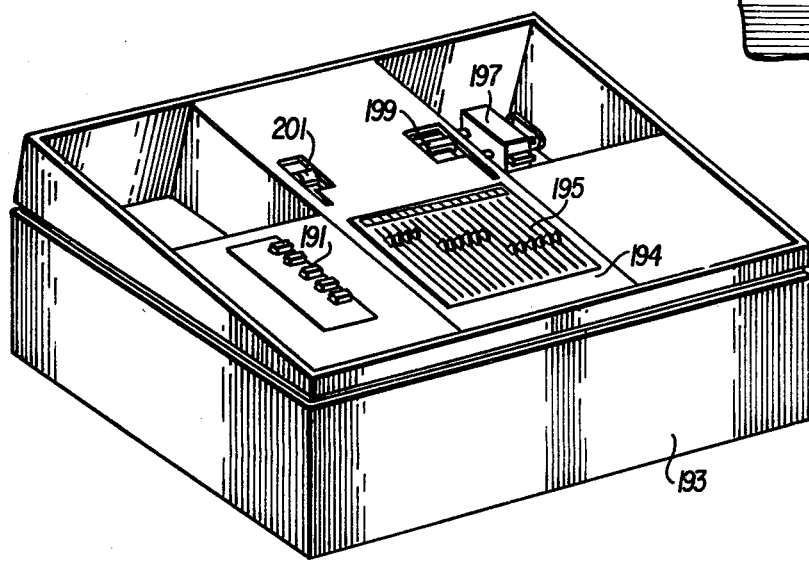
FIGS. 3a-3e show the repetitive MICR head employed in a printing module of the present invention.
Figure 3B:
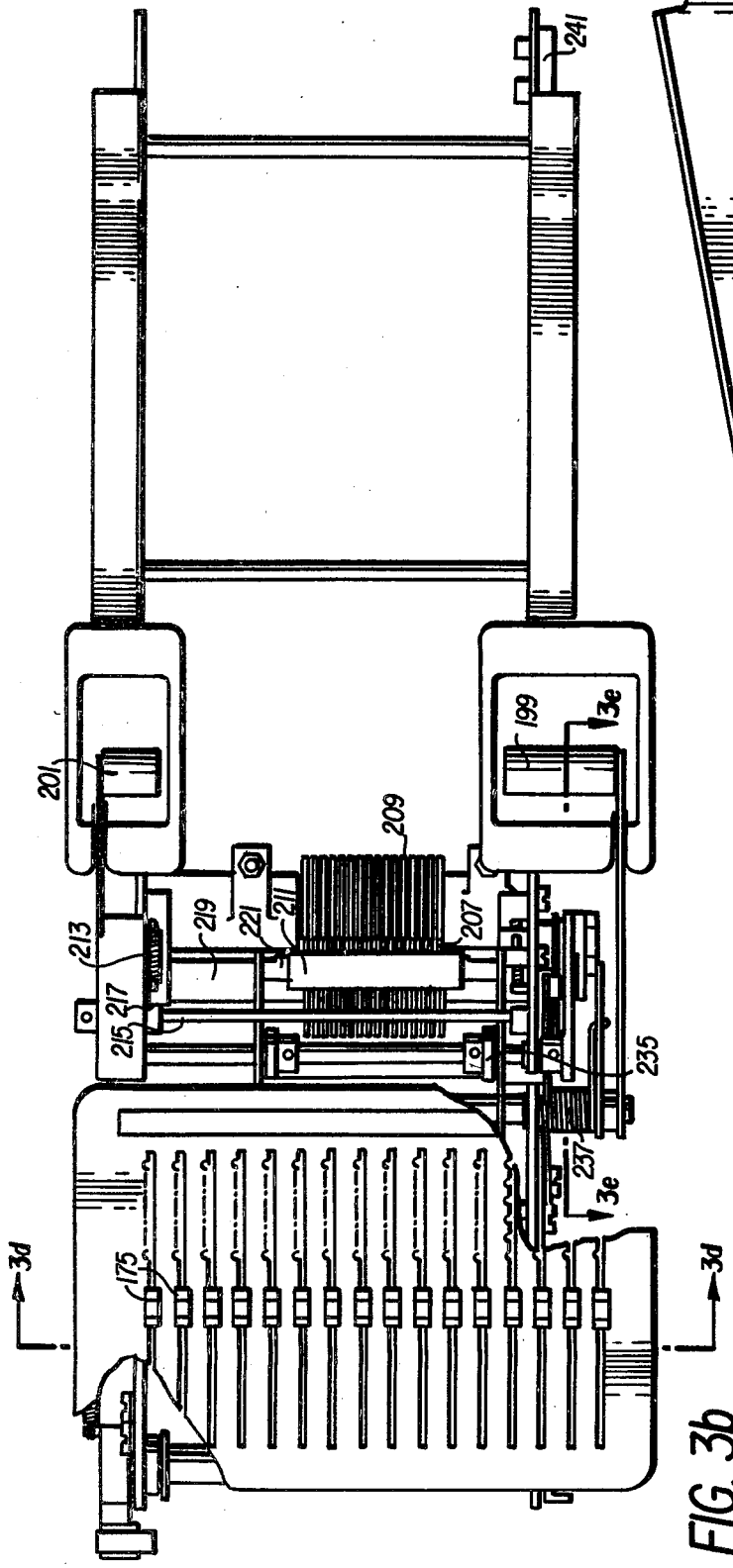
Figure 3C:
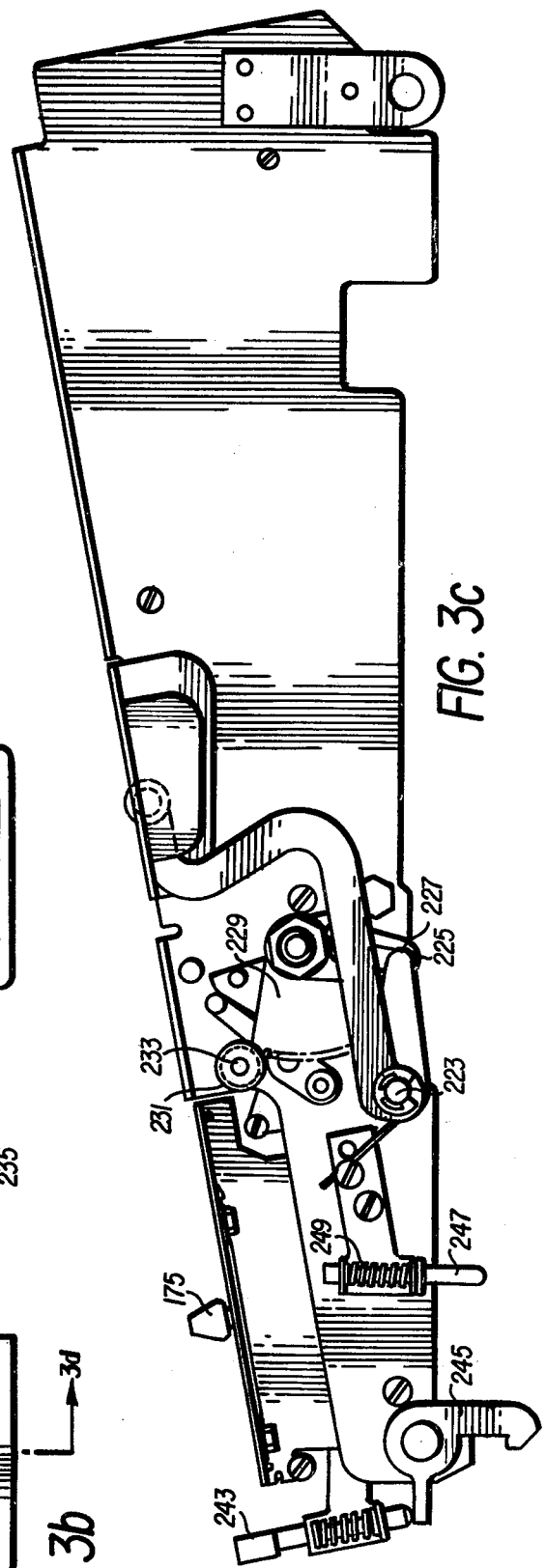
Figure 3D:
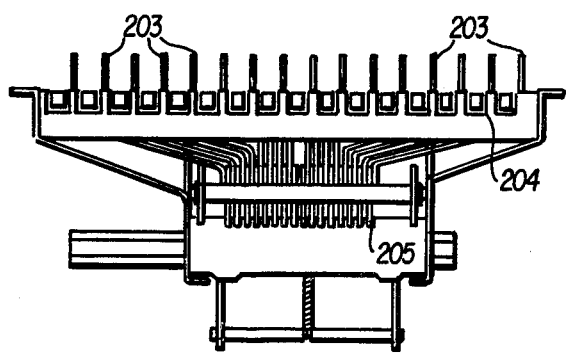
Figure 3E:
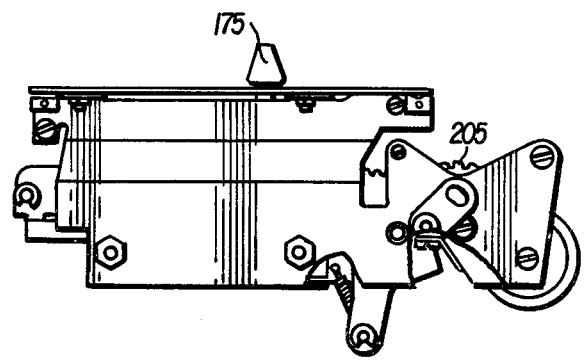

FIG. 3a shows the repetitive MICR encoding printing module which can be employed to repetitively print fixed information in machine readable forms such as fields 35, 43 and 57 shown in the sample documents of FIG. 1b. As a further introduction to the depicted embodiment let it be understood that FIGS. 3b–3e show in more detail the features of the MICR print head 194 depicted in FIG. 3a. FIG. 3b is a top view of the print head with that portion of the cover above the keys 195 removed. FIG. 3c is a side view of the print head as shown in FIG. 3b. FIG. 3d is a cross sectional view of the key selector portion of the print head taken along the lines 3d—3d. FIG. 3e is a partial view of the print head as depicted in FIG. 3b taken along lines 3e—3e.

The repetitive MICR encoding module includes a set of control buttons 191 for placing the module into either flow mode, by-pass mode, run mode, or single cycle mode. The module comprises a base member 193 which houses a document transport mechanism for the module and a printing head portion 194 which is hinged to the base member 193 and carries the mechanisms for printing on documents which are positioned below it in the module. Keys 195 are employed to select the proper MICR characters to be repetitively printed and end stop 197 is provided to position the printing horizontally along a document. The print head 194 includes a character reset lever 199 and a character change lever 201 which are manipulatable to either clear or change the selection of the keys 195. Each key 175 is connected to a bent arm member 203 which in turn ride in channels 204 as shown in FIG. 3d. Each of the bent arms 203 in turn urges a corresponding toothed rack 205 (FIG. 3e) forward and backward in unison with forward and backward movement of the key 175. Each of the toothed racks 205 in turn engage a type select wheel 207 (FIG. 3b) which cause the individual print wheels 209 to rotate so as to present the proper character type face to the printing area. Guide element 211 includes a guiding channel for each of the toothed racks 205 to insure proper alignment with their corresponding type select wheel 207. Handle 201 is the type wheel release handle and is spring biased by springs 213 in its deactivated position. Handle 201 pivots about shaft 215 which is linked at 217 to centering bar 219. The type wheels 209 are of a gear tooth profile with every other tooth removed and replaced with a printing character. Centering bar 219 has a centering protrusion 221 which is adapted to intermesh with the gear teeth to lock the character print wheels against rotation. It is by pulling up handle 201 and rotating it about shaft 215 that the centering bar 219 is pulled back and the centering protrusion 221 is pulled out of engagement with the character wheels 209. This permits changing the printing characters of the character wheels 209 by movement of the keys 195. Clearing handle 199 is provided to simultaneously move all of the keys 195 to their blank or non-printing positions. Handle 199 must be pulled up after handle 201 has been actuated to remove the central protrusion from the locking position. The handle 199 rotates about a center 223 (FIG. 3c) to drive link 225 in the slot 227 of the segment gear 229. Segment gear 229 engages pinion wheel 231 which drives a shaft 233 which in turn drives two more pinions. The pinions drive clearing racks 235 toward the base of the keys and returns the keys to their blank or nonprinting position. The return of the keys 195 to their blank or non-printing position causes the appropriate movement in their respective racks and type select wheels 207 to position the type wheels 209 into a position where no character is in a printing position. The clear handle 199 is urged back to its rest position by spring 237. As was previously mentioned, FIGS. 3b, 3c, 3d, and 3e only show portions of the print head of the repetitive MICR module. The connection of the print head with the base is made by inserting an axle through rotating hinge members 241. The print head is released by depressing button 243 to trip catch 245. The printing head is spring biased in the closed position by pin 247 and spring 249 such that when in the latched position the print head is spring biased into a constant position and therefore adjustable to produce a constant print quality.

FIGS. 4a through 4f show the components which comprise the consecutive MICR printing module. This module could be employed, for example, to print in machine readable form the field 37 of the document shown in FIG. 1b which was explained to be the check number and would permit sorting of the checks in numerical sequence.

Figure 4A:
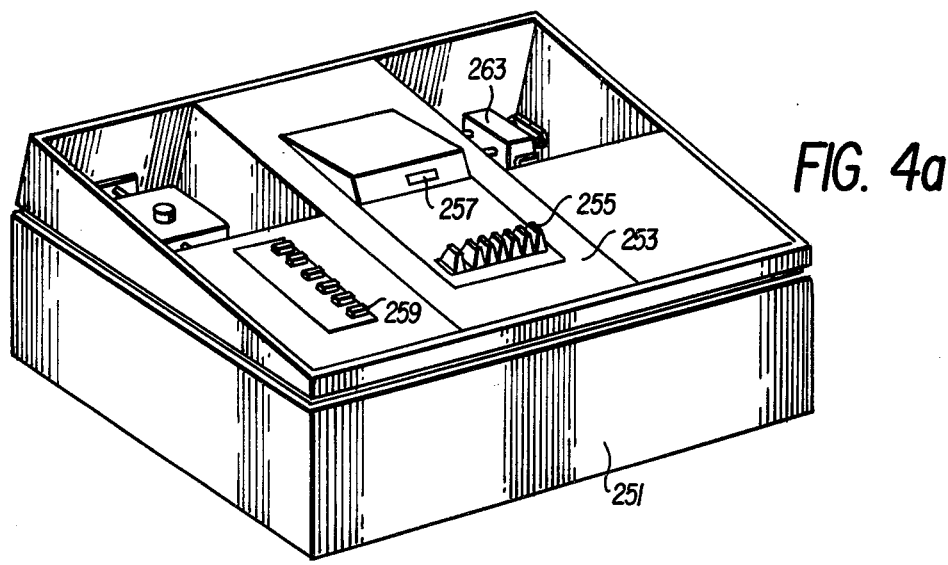
Figure 4C:
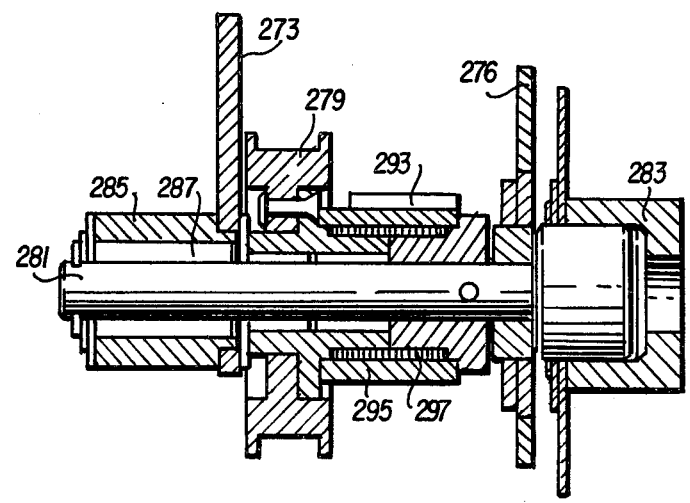
Figure 4B:
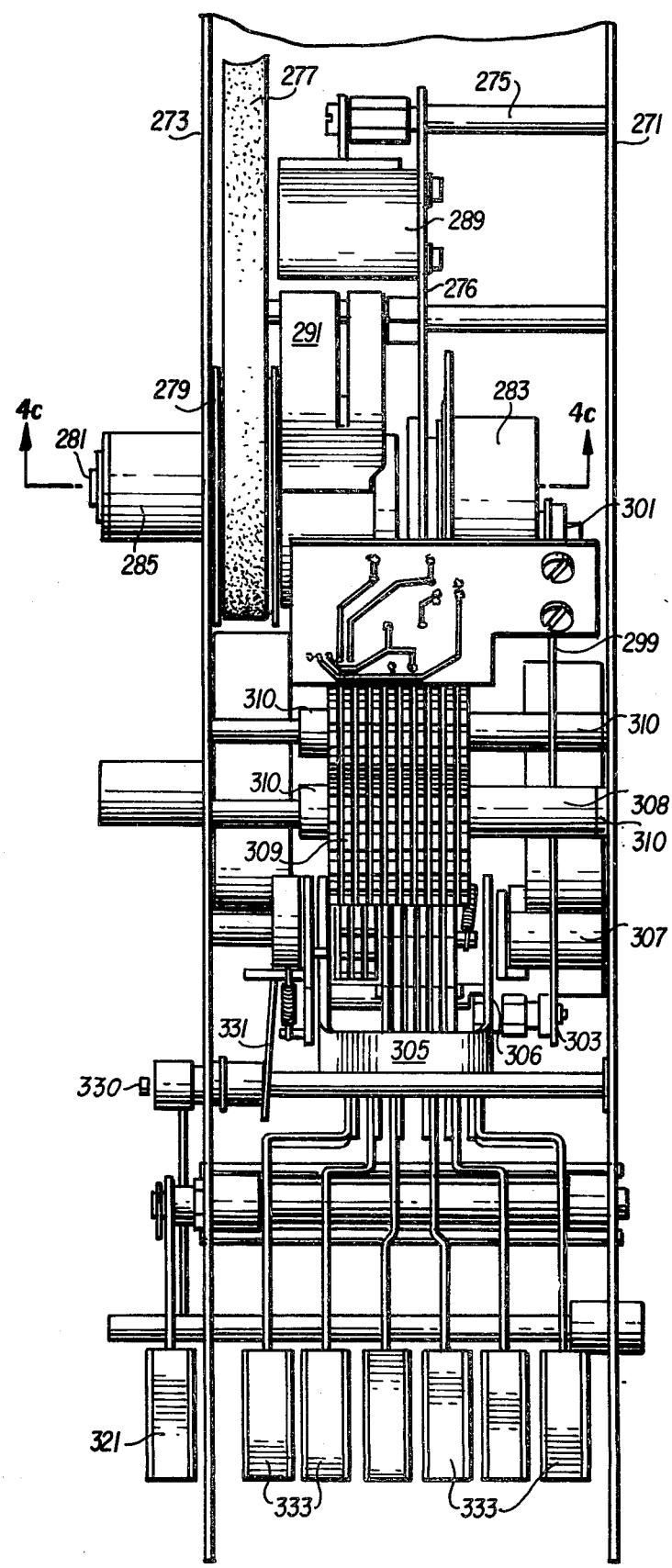

The MICR consecutive numbering printing module as depicted in FIG. 4a includes a base 251 enclosing a printing platen and a document transport system. Print head 253 is hinged to the base 251 and includes a plurality of number selecting keys 255 which permit any number to be selected as the ending number for a group of documents which are to be sequentially numbered. Window 257 permits an operator to view indicator wheels which show the number currently printing. Module control buttons 259 are provided as in the repetitive module as is end stop 263. FIGS. 4b–4f show the consecutive MICR printing module in more detail. FIG. 4b is a top view of the print head 253 (FIG. 4a) with the cover removed. FIG. 4c is a cross sectional view of a clutch assembly shown in FIG. 4b and taken along line 4c—4c. FIG. 4d is a bottom view of the print head depicted in FIG. 4b, and FIG. 4e and FIG. 4f are right and left side views, respectively, of the print head depicted in FIG. 4b.

The consecutive MICR printing module as shown in FIG. 4b includes a right side frame member 271 and a left side frame member 273. A pivot shaft 275 runs between the right side member 271 and the interior structural member 276. A drive belt 277 is shown connected to pulley 279. The other end of the drive belt 277 is connected in a conventional manner to a jack shaft and motor which are not shown. The pulley 279 is free to rotate on clutch shaft 281. FIG. 4c is a cross-sectional view of the clutch shaft and shows the shaft 281 with the pulley 279 in juxtaposition to the left side plate 273. A hub 283 is connected to the right end of the clutch shaft 281 outside of the interior support member 276. On the left end of the clutch shaft 281 is a hub member 285 which surrounds a Torrington bearing and one-way clutch 287 which insures that the clutch shaft 281 rotates in only one direction. To make the clutch into a single revolution clutch a solenoid 289 is provided with a stop arm 291 which is adapted to engage a stop area 293 on the stop collar 295 of the clutch. The clutch spring is shown as 297. A link 299 is attached to hub member 283 of the clutch shaft 281 by connector 301. This is best shown in FIG. 4e. As shown in FIG. 4b, the link 299 runs from the hub 283 to a stud 303 on actuating yoke 305. The actuating yoke 305 is connected by arm members 306 in such a manner to rock around pivot shaft 307 upon a revolution of the clutch which in turn causes a revolution of connector 301 in actuation of the link 299. Indicating wheel shaft 308 has mounted thereon indicating wheels 309 appropriately positioned on the shaft by spacers 310. As shown in FIG. 4b the two outside indicating wheels contain conventional characters. The indicating wheels 309 do not print but show through a window in the top of the consecutive MICR printing module which numbers are currently in the printing position. In FIG. 4d the actual printing wheels 313 are shown. As in the repetitive MICR module, the printing wheels are of a gear tooth configuration where every other gear tooth has been removed and replaced by a character die. The print wheels 313 are normally prevented from rotating by centering plate 315 which engages the geared teeth of the print wheels 313. The centering plate 315, however, is attached to the actuating yoke 305 such that when link 299 is driven by a single revolution clutch, the actuating yoke 305 rocks the centering plate 315 out of engagement with the engaging teeth 311 to permit the print wheels 313 to rotate about print wheel shaft 312. Appropriate spacers 314 have been provided to insure the alignment of the print wheels 313 with the engaging teeth 311. Return spring 319 is provided to bias the centering plate 315 into engagement with the print wheels 313 to lock them into a fixed position. Each time the single revolution clutch is actuated and the link 299, actuating yoke 305 and centering plate 315 traverse one cycle of operation, the print wheels 313 are sequenced to decrement one from the number previously printed. The numbers are decremented in units of 1 from right to left.

In actual operation of the consecutive MICR module the printing wheels are set up to the final number which is desired to be printed and are counted down according to the number of documents which are being processed in that particular document lift or set. In order to set the printing wheels 313 to the proper number it is necessary to depress reset button 321 (FIG. 4f) which rotates about center 323 and actuates link 324 to rotate about center 325 and drive link 327. Link 327 in turn drives link 329 which causes rotation of a pivot shaft 330 which in turn drives link 331 (FIG. 4b) to rock actuating yoke 305 in a manner that centering plate 315 is out of engagement with print wheels 313. Next, the operator while continuing to depress reset key 321 will depress one of the selector keys 333 which drive key arms 335 (FIG. 4d) and selector pawls 339. The selector pawls 339 cause engaging teeth 311 to contact their corresponding gear teeth in print wheels 313 to rotate the print wheels 313 one printing position. Pawl return spring 337 returns the selector keys 333 to their unactuated position and the operator repeatedly depresses the actuating keys 333 until the appropriate printing character in the corresponding print wheel 313 is in the printing position. At this point, reset arm 321 is released and yoke 305 rocks back to urge centering plate 315 into engagement with the gear teeth of the print wheels 313 to thereby lock the print wheels in their set position.

Figure 5A:
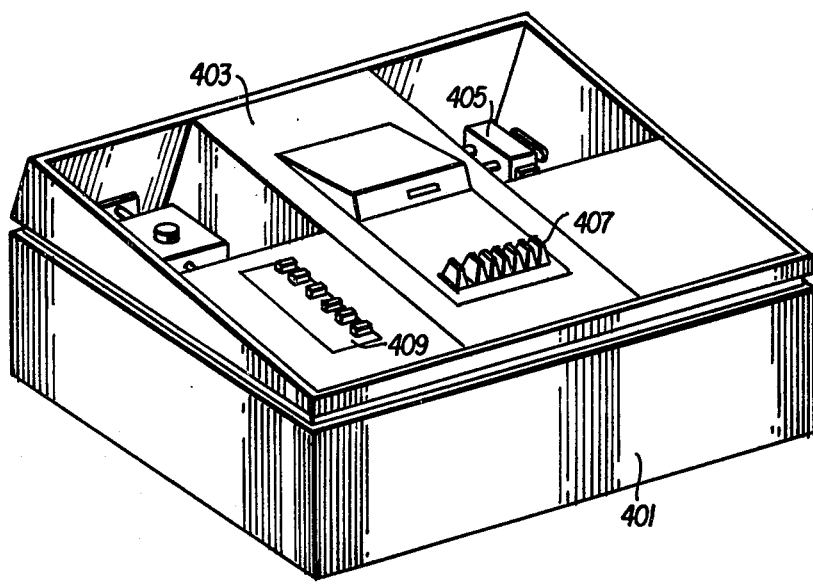
FIGS. 5a and 5b show the consecutive conventional print head employed in a printing module of the present invention.
Figure 5B:
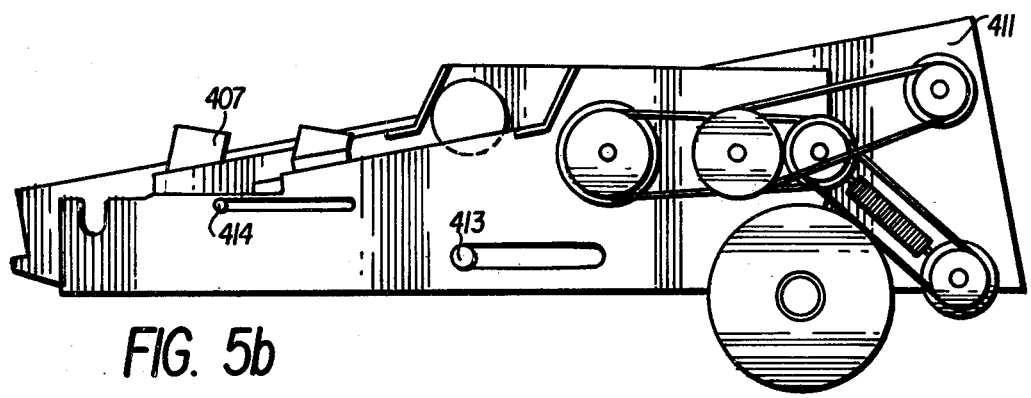

FIGS. 5a and 5b show in more detail the consecutive conventional numbering printing module of the instant apparatus. The consecutive conventional numbering printing module is very similar to the consecutive MICR printing module previously described except that the characters printed by the conventional module are not machine readable. The consecutive conventional numbering printing module in FIG. 5a includes a base member 401 with a hinged printing head 403. An end stop 405 is provided for horizontal positioning of printing on a document and the keys 407 are employed to permit an operator to select a particular sequence of numbers which are to be printed on the documents. Once again, as in the other previously defined modules, the consecutive conventional numbering printing module has its own separate controls 409 which permit this module to be placed in either the stop, single cycle, automatic, bypass or run modes.

FIG. 5b is a side view of print head 403 (FIG. 5a) with the cover removed. The consecutive conventional printing module differs from the consecutive MICR printing module in that in the former the printing can be selected for different vertical locations on a document. This is accomplished by means of shaft 413 (FIG. 5b) which is the print wheel shaft. Shaft 414 moves within slot 415 in cooperation with the movement of shaft 413 to permit the positioning of the print head vertically on the face of a document.

Figure 6A:
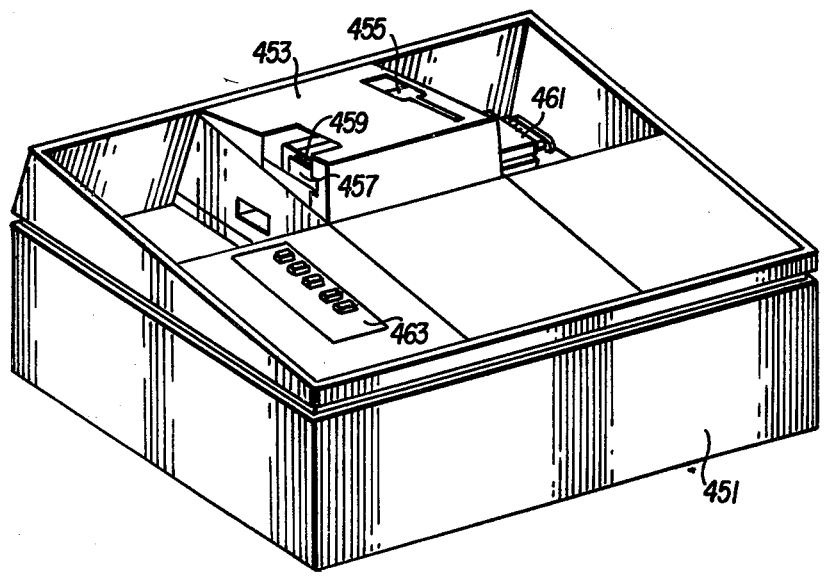

In FIGS. 6a through 6e the repetitive alpha printing module is described in more detail. In FIG. 6a it is seen that the alpha module comprises a base portion 451 and a print head 453. Pivot arm 455 is provided to rotate the alpha printing plate holder 457 so that a different printing plate 459 can be provided for printing on the face of documents. Again, an end stop 461 is provided to position the printing horizontally on the check and control panel 463 enables the modules to be placed in any of five modes: bypass, stop, single, automatic or run.

Figure 6B:
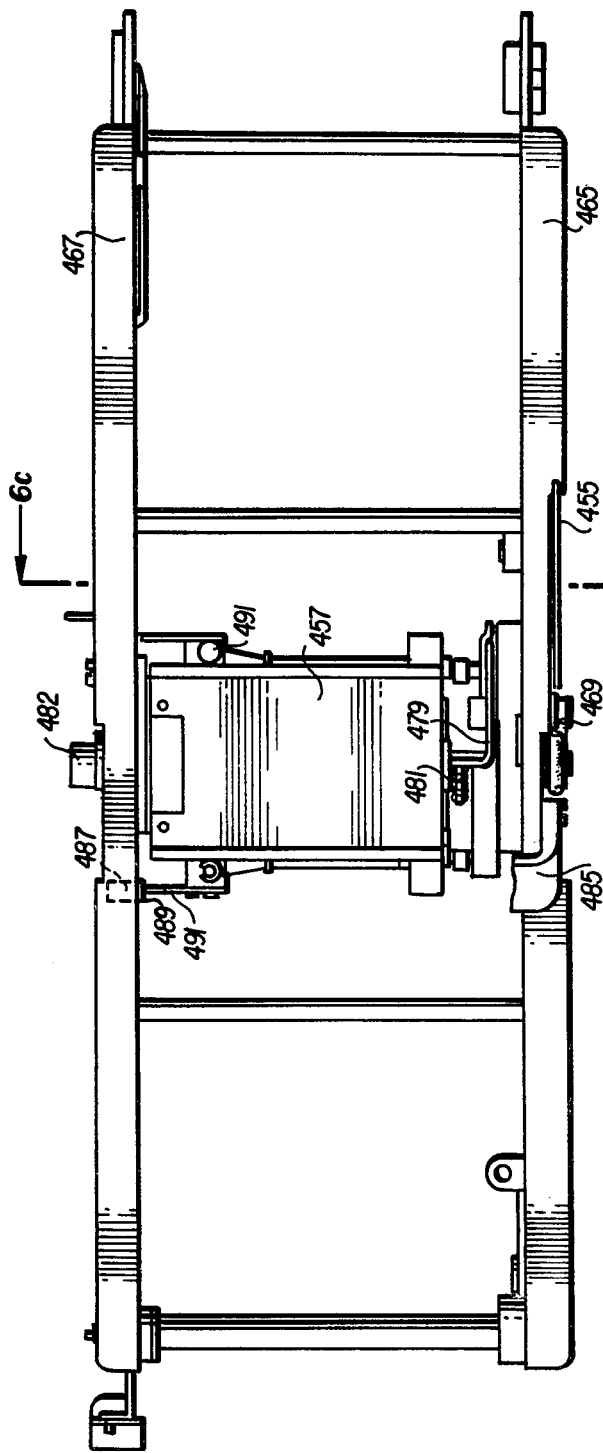
Figure 6C:
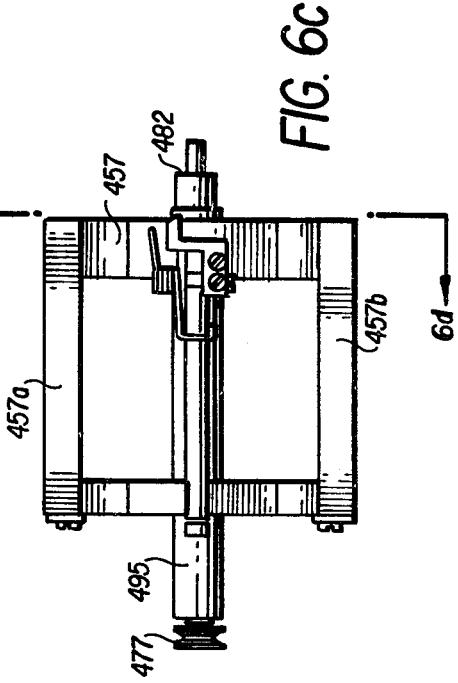

FIG. 6b is a top view of the alpha print head 453 (FIG. 6a) with the exterior housing removed. The alpha printing head as shown in FIG. 6b includes a right side plate 465 and a left side plate 467. The top of the printing plate holder 457 is clearly shown as is the printing plate holder pivot shaft 482 extending between the side plates. FIG. 6c is a cross sectional view of the alpha print head depicted in FIG. 6b taken along line 6c—6c. FIG. 6c presents a side view of the printing plate holder 457. The holder 457 comprises two printing plate receiving members 457a and 457b located 180° apart on printing plate holder shaft 482. This permits an operator to insert a new printing plate into plate receiving member 457a when the alpha print head is printing with a different printing plate in member 457b. A considerable time savings results with this configuration because to change from one printing plate to another only requires printing plate holder 457 to be rotated 180° and does not require a lengthy interruption of document processing.

Figure 6D:
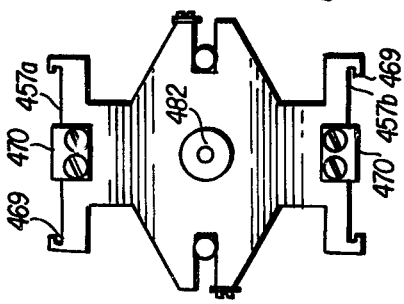

FIG. 6d shows a cross section of printing plate holder 457 (FIG. 6c) taken along the line 6d—6d. Each printing plate receiving member 457a and 457b includes retaining tracks 469 and a stop plate 470 to accurately position a printing plate into a receiving member 457a or 457b. A printing plate comprises a thin rectangular member insertable within guides 469 and containing raised character dies adapted to make legible character imprints when employed with a platen, document and suitable ink transfer means. FIG. 6e is a side view of the alpha print head depicted in FIG. 6b and shows in detail the mechanism for rotating the printing plate holder 457 between operative printing positions. Pivot arm 455 rotates about pivot 456 and includes a small roller 475 attached at pivot 456. An elongated belt 471 forms a continuous loop around drum 473, roller 475 on pivot arm 455, and roller 477 on printing plate pivot shaft 482. The printing plate holder 457 is normally held immovable by arm 479 (FIG. 6b) which opposes compression spring 481 and holds printing plate pivot shaft 482 immovable. The arm 479 is mounted on pivot 456 as is the pivot arm 455 such that lifting pivot arm 455 causes the arm 479 to lose engagement with compression spring 481 and unlock the printing plate pivot shaft 482. Movement of pivot arm 455 also causes the belt 471 to move and frictionally rotate roller 477 on the end of printing plate pivot shaft 482 such that when the pivot arm 455 has been fully actuated the printing plate holder 457 has been unlocked and rotated 180°. Replacing the pivot arm 455 relocks the printing plate holder 457. Return spring 483 is provided to return pivot arm 455 to its unactuated position.

The printing plate holder 457 is provided with a safety switch to indicate that the printing plate holder is in an operative printing position or to disable printing by the alpha printing head if the plate holder 457 is not in a fully operative condition. The switch 487 (FIG. 6b) is attached to left side plate 467 and includes a plunger 489. Contact arms 491 are attached to each of the printing plate receiving members such that whenever the printing plate holder is in an operative printing position one of the contact arms 491 will engage plunger 489 and actuate switch 487. An appropriate lead 493 is provided to supply the switch signals to the control system within the alpha printer module.

Figure 7:
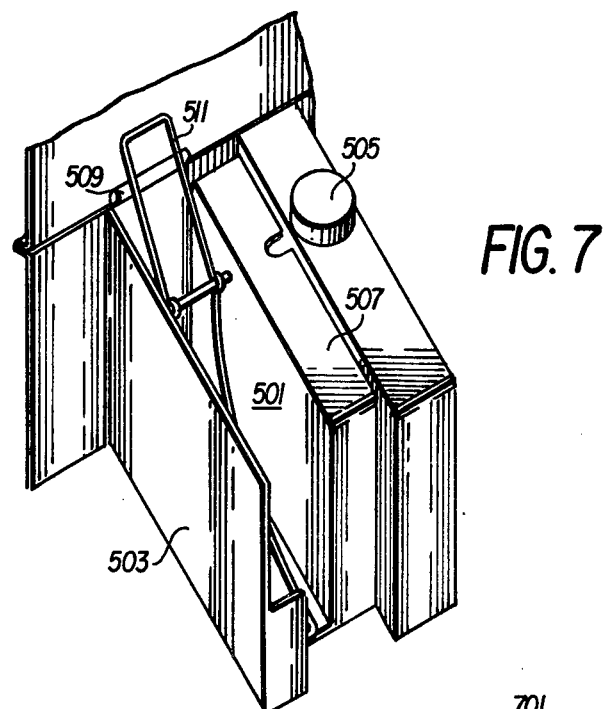
FIG. 7 shows the document receiving module of the present invention.

FIG. 7 shows the document receiving module which is attached to the end of the modular printing system to receive documents after they have been completely processed by the system. The receiver module includes a document receiver hopper 501, a fixed wall 503 on one side of the hopper 501, a hopper adjustment knob 505 and a movable wall 507. The document adjuster knob 505 works in cooperation with the movable wall 507 under the same principles as the document feeder hopper in the feeder module. The document receiver module shown in FIG. 7 employs the same parallelogram hinge and spring combination as the feeder module to permit adjustment of the width of the document receiver hopper 501 according to the size documents being processed by the system. The documents emerge from the printing modules through slot 509 and are guided into a proper stacking relationship in the hopper 501 by the wire document guide member 511.

To summarize the disclosure to this point, there has been a description of a feeder module for individually feeding documents into the system. A series of printing heads for printing selected information in particular fields on the documents have been discussed as well as the receiver module for the processed documents. The portion of the invention to be subsequently discussed is the document transport system which functions within each printer module to convey the documents within each module for printing and for passage into either a subsequent printing module or the receiver module.

FIG. 8 shows a representative simplified embodiment of the document transport system which is common to all the printing modules. In general terms, the document transport system includes transporting portions 511 at which point force is applied to the documents to move them through the module and printing locations 513 which coincide to the area where the printing heads are located for printing upon documents being transported through the module. The document transport system in each module contains a conventional motor, belt and pulley not shown in FIG. 8 but known in the art to drive the main shaft 515. Pulleys 517 on main shaft 515 are connected by continuous belts 518 to the drive pulleys 519. As can be seen the drive pulleys 519 are interconnected by drive belts 520. The top portion of the drive pulley 519 is intended to contact one surface of the document as it passes through the document transport system to transport the documents through the module. Each module includes an appropriate lead edge sensor 521 which may be an optical sensor to signal to the control system located in the feeder module that a document has entered the particular printing module. A signal is generated when a document passes the sensor 521 and the signal propagated to the control system in the feeder module and within the printing module.

FIG. 8a is a cross sectional view of FIG. 8 taken along the lines 8a—8a and shows a document guide and hold-down device to assist the document transport system in moving the documents through the transport. Belt 518 is connected to main shaft 515 and serves to rotate the drive pulley 519. A document support plane 527 is provided for supporting one face of documents which are transported through the modules. The document hold-down device 529 is provided to increase the friction between the documents and the drive pulleys such that the documents can be transported at the speed of the drive pulleys. The hold-down device 529 includes a ball 531 and a pocket 533 to urge under the force of gravity the document against the drive pulley 519. The device is supported by appropriate brackets 535 and a document edge guide 537 is provided as a channel for one edge of the document as it traverses the transport system. The drive pulleys 519 can be skewed relative to the direction of the documents such that an edge of the document is urged into registration with the edge guide 537.

Figure 9A:
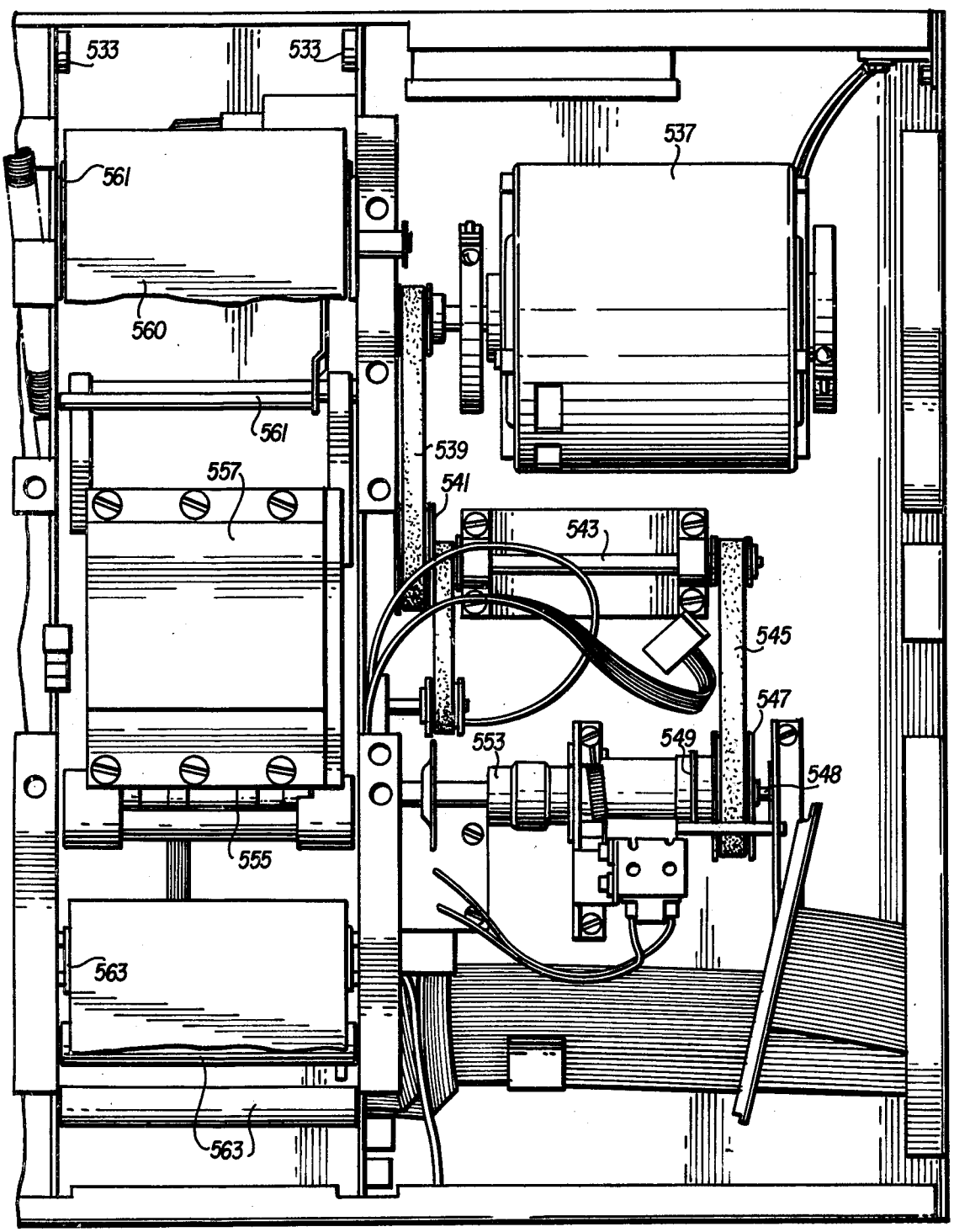

FIG. 9a is a view of the base portion 451 of the repetitive alpha printing module. The drive motor 537 is connected through an appropriate belt 539 to pulley 541 on jack-shaft 543. Belt 545 runs from jack-shaft 543 to the pulley 547 on the platen drive shaft 548. On shaft 548 is a dual spring single revolution clutch 549 which permits rotation of the shaft 548 in a single direction and only in units of complete revolution. Coupling 553, in a manner which will hereinafter be described, drives the link and toggle mechanism generally indicated at 555 to reciprocate the platen 557 in a vertical direction. The platen 557 defines the area where printing on the documents is to occur and such printing is accomplished by the platen 557 being raised to impact documents on the platen 557 against an ink ribbon and the printing plate in the alpha-printing head shown in FIG. 6a through 6e. A printing ribbon 560 partially shown in FIG. 9a extends from the spring loaded ribbon holding elements 561 across the platen 557 to the ribbon take-up spools 563. The spools 563 are designed to keep the ribbon aligned with the face of the platen 557.

FIG. 9b is another view of the alpha-printing module of the instant modular printing system. It shows the alpha-printing module base 451 and the alpha print head 453 hinged to the base at 533. Element 461 is generally referred to as the end stop or the means for horizontally positioning the printing on the documents. The end stop 461 includes two guide rods 573 and 575 which support a solenoid unit 577. An end-stop arm 579 extends from the solenoid to a stop arm 581. The stop arm 581 pivots with the end-stop arm 579 to raise and lower the document stop 583. In the lowered position the document stop 583 intercepts a document passing through the module in the document transport system and holds it in a fixed position with the leading edge of the document abutting the document stop 583. In the raised position the document stop 583 is pivoted out of the way of the documents and does not impede the passage of documents through the printing module. The solenoid 577 is actuated by the lead edge sensor 521 which is positioned at the beginning of the document transport system within each printing module. As the document passes over the lead edge sensor 521 a signal is provided to the system control which actuates the solenoid 577, rotates the end-stop arm 579 and causes the stop arm 581 to pivot and lower the document stop 583. Since the document stop 583 intercepts the lead edge of the document, by adjusting the position of the solenoid 577 on the guide rods 573 and 575 the document can be caused to stop over the platen 557 at any of the number of positions. This enables horizontal printing positioning. If printing is desired on the far right hand edge of the document the solenoid would be positioned on the left on the guide rods 573 and 575 and, likewise, if printing is desired on the left of the document the solenoid 577 would be positioned to the right on the guide rods 573 and 575. When the document stop 583 is lowered to intercept and stop a document passing through the printing module, a portion of the document will come to rest over the platen 557. When this occurs the single revolution clutch will traverse a single revolution and by means of the coupling 551 and the main shaft 553 (FIG. 9a) and the double toggle and link platen actuating mechanism 555 the platen is raised to impact the document against an ink ribbon 556 and the character dies in printing plate holder 457 to perform the desired printing. After printing occurs, the platen is lowered to its normal position and the solenoid 577 is deactivated causing the document stop 583 to lose contact with the document and thereby permit the document to pass out of the printing module under the influence of the document transport system.

Figure 9C:
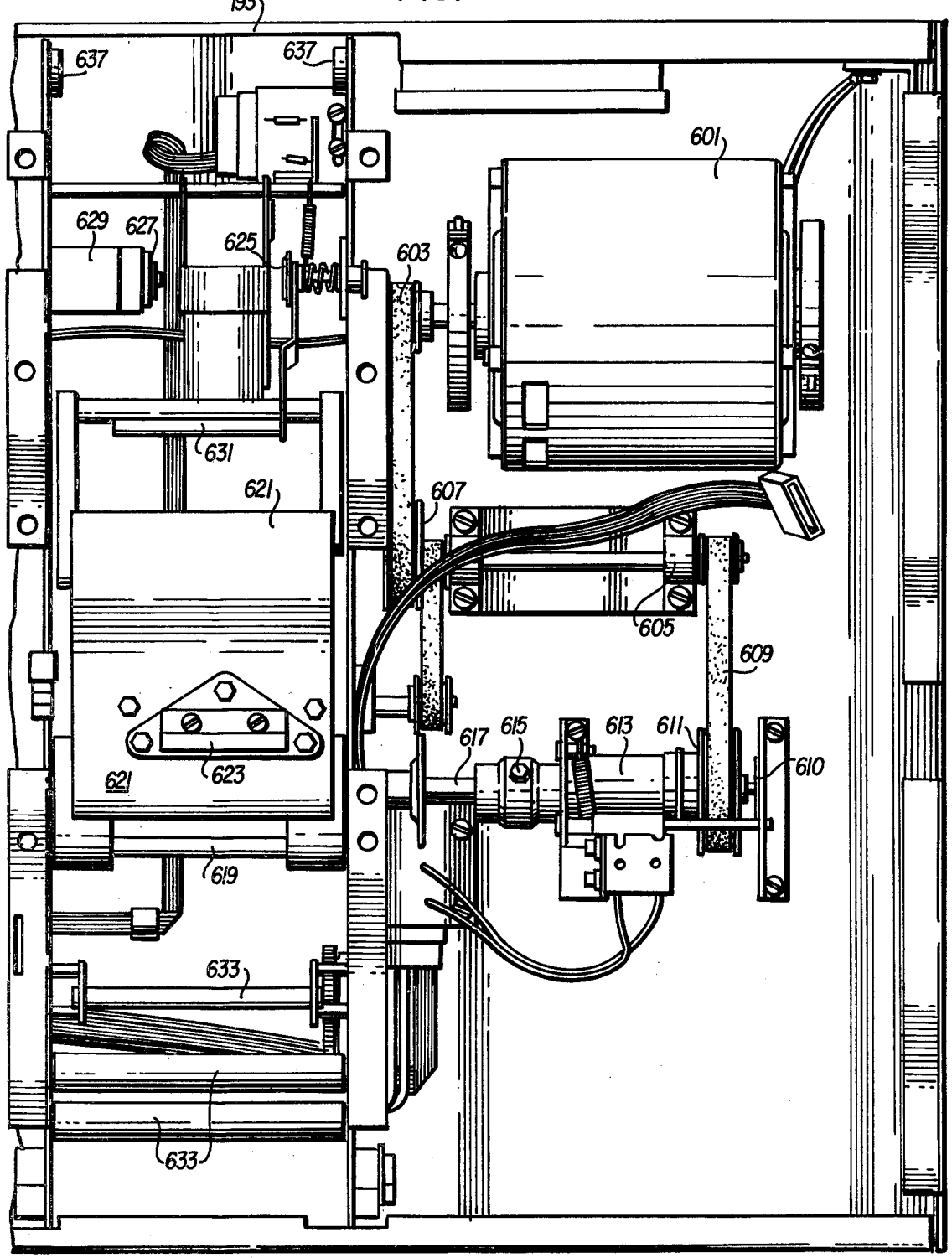

FIG. 9c is a top view of the consecutive MICR print unit base 193 shown in FIG. 3a with the print head and covers removed. As is shown in FIGS. 9a and 9b pertaining to the base unit for the alpha printing unit, the consecutive MICR print unit base 193 includes a drive motor 601 with belt 603 driving jack-shaft 605 through pulley 607. Continuous belt 609 connects a pulley on the jack-shaft to another pulley 611 on the clutch-shaft 610. A single revolution spring clutch 613 is adjoined to the clutch-shaft 610 with vernier coupling 615 interconnecting the clutch 613 to the main shaft 617 which in turn is coupled to the platen actuating mechanism 619 as will hereinafter be described. The actual platen for the consecutive MICR print unit is shown as 623 and corresponds to a narrow band for printing along the bottom of documents in the position where machine readable characters are normally printed, e.g. fields 35, 43 and 57 in FIG. 1b. The platen 623 is connected to platen support plane 621 which in turn is reciprocated up and down by this platen actuating mechanism as the main shaft 617 is rotated by the single revolution clutch 613. A ribbon support means for this module includes the spring loaded member 625 and the fixed member 627 for supporting a ribbon spool. A spacer 629 has been provided to position the ribbon so that it will be aligned with the platen 623. A ribbon guide arm 631 stabilizes the ribbon before it passes over the platen 623 to the ribbon take-up spools 633. If MICR characters are to be printed the ribbon is a special magnetic type of ribbon commonly employed in magnetic printing. The ribbon has been omitted from FIG. 9c to more clearly show the underlying mechanisms. The repetitive MICR printing head 194 shown in FIG. 3a is hinged to the base 193 at points 637. The base unit for the consecutive MICR printing module is exactly the same as the repetitive MICR printing module except for minor modifications to accept different width ribbons and for different placements of the platen 623 on the platen support planes 621.

Figure 9D:
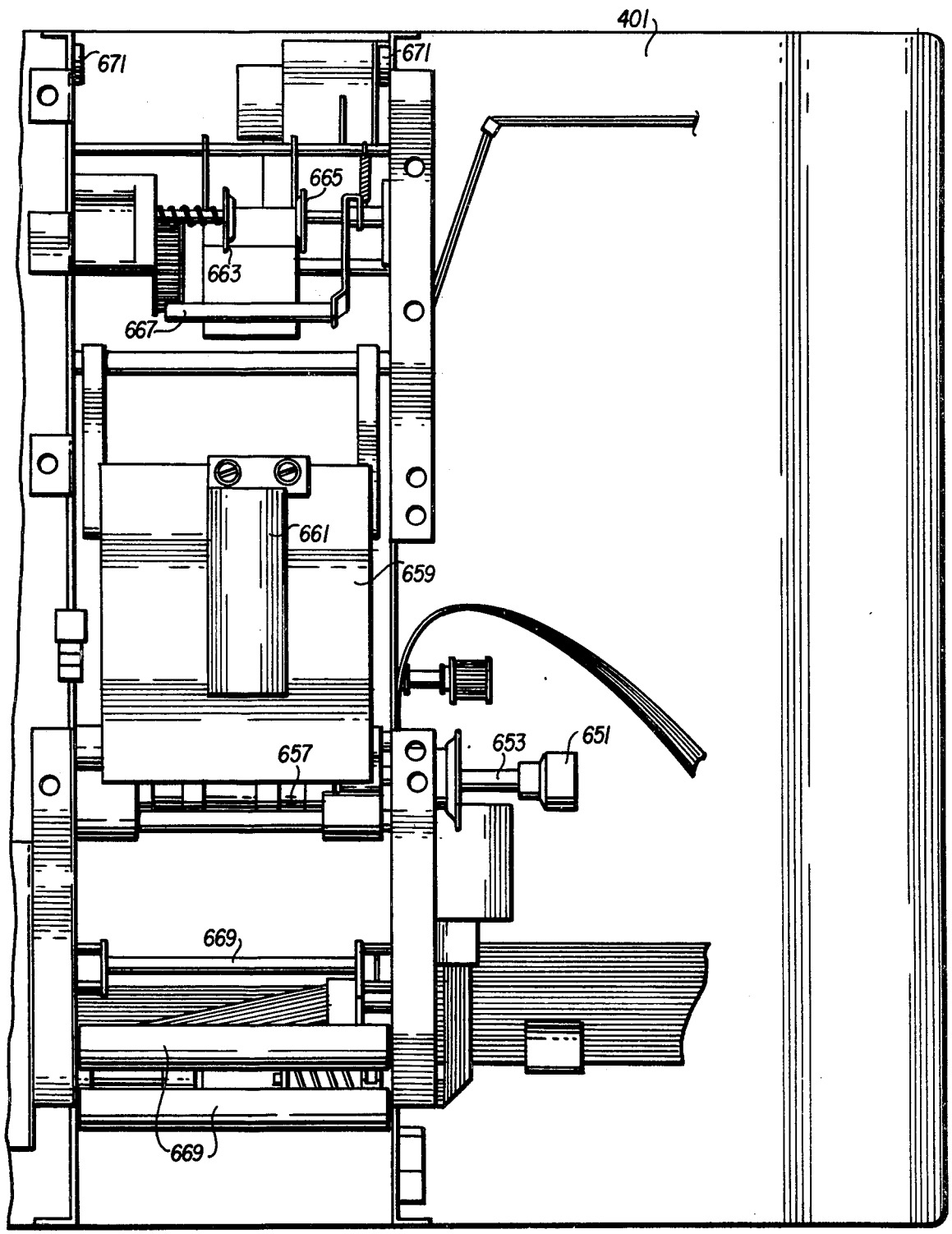

FIG. 9d shows the base unit for the consecutive conventional printing module shown in FIG. 5a. The base unit 401 is shown without the motor, jack-shaft and clutch assembly which are common to all base units and have been previously described. The base unit includes vernier coupling 651 and main shaft 653 by which means the platen actuating mechanism 657 reciprocates the platen supporting plane 659 vertically. The platen 661 is located on the platen supporting plane 659 and is advantageously the same or greater width as the print area on the documents being processed. Such a width is necessary because, as was previously explained, the consecutive conventional printing module includes adjustment means for vertically positioning the printing on the document as well as an end stop mechanism for horizontally positioning the printing. A spring loaded ribbon mounting device 663, 665 is provided together with ribbon guide arm 667 which tracks the ribbon across the platen to the ribbon take-up spools 669. The consecutive conventional printing head 403 is hinged to the base 401 at 671.

Figure 10B:
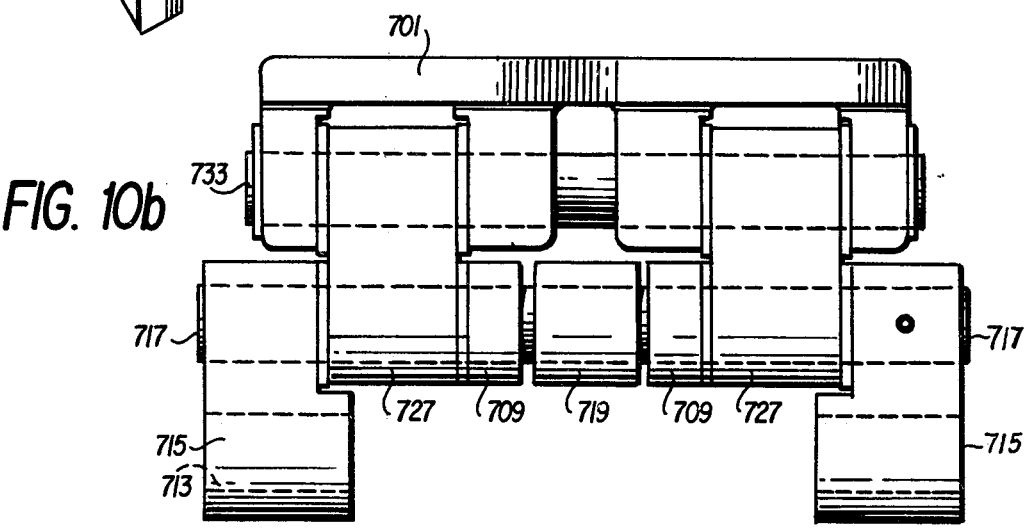
FIGS. 10a-10d show the toggle and link mechanism which raises and lowers the printing platens employing the printing modules of the present invention.
Figure 10C:
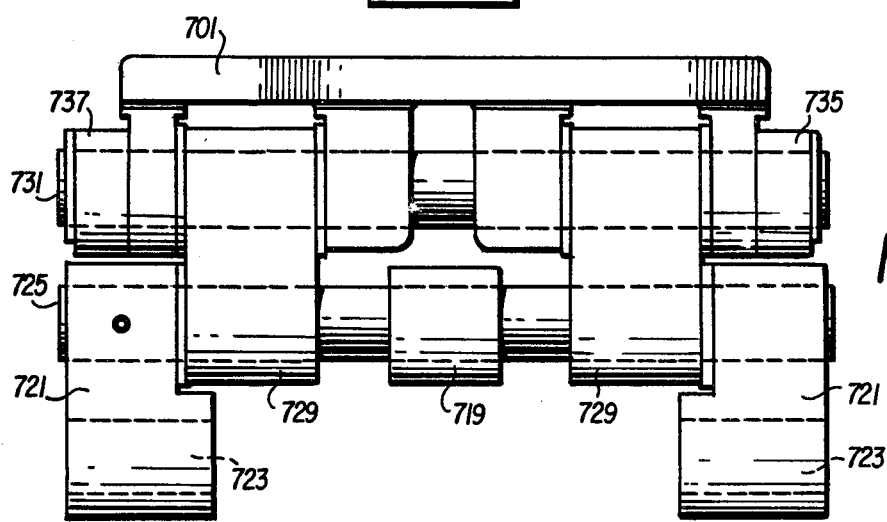
Figure 10A:
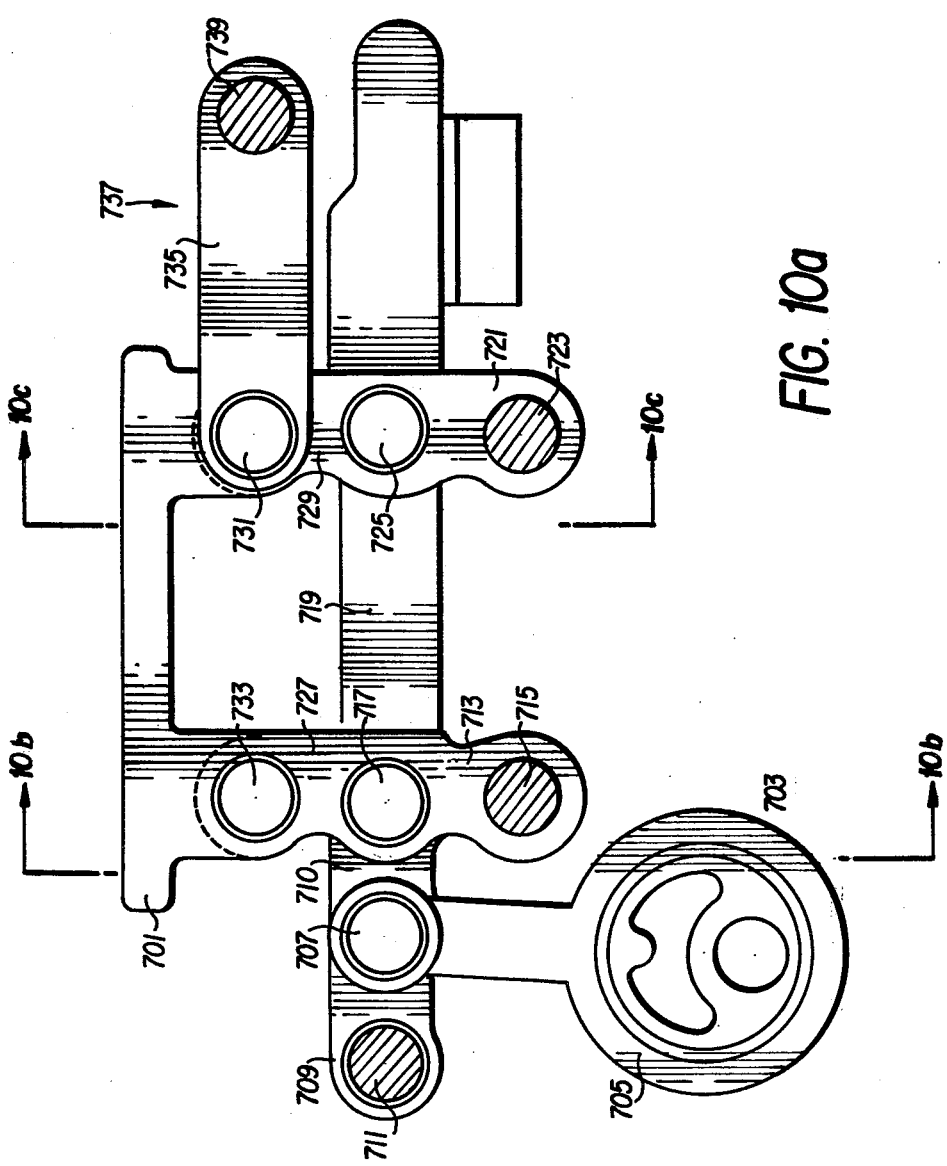

FIGS. 10a, 10b and 10c show the platen actuating mechanism which translates rotational movement of the main shaft into vertical, reciprocating movement of the platen of each printing module. Broadly, this motion translation is accomplished through a double toggle and link mechanism whereby links at both ends of the platen are moved by a series of toggles and other links to insure that the platen reciprocates as a plane in a true vertical direction. FIG. 10a is a side view of the platen actuating mechanism which in effect comprises a common submodule within each base portion of the printing modules. The main shaft interfaces with the platen actuating mechanism through eccentric bearing 703 and link 705. Pivot shaft 707 links the bearing to shaft 711 and link 709. A fixed connection at shaft 711 maintains the link 709 in a normally fixed position that is designed to deflect to a certain extent if the platen is overloaded to prevent damage to the platen actuating mechanism. Link 710 is employed to connect shafts 707 and 717. The link 709 is also connected to shaft 707. Link 719 connects shaft 717 and 725. Vertical links 713 and 721 are respectively fixed at one end by shafts 715 and 723 with the other ends free to move about shafts 717 and 725. A second set of vertical links 727 and 729 extend from shafts 717 and 725 to shafts 733 and 731 respectively. The platen 701 is also connected to the shafts 731 and 733. Stabilizing links 735 and 737 extend from a fixed pivot point around shaft 739 to a free pivot point on shaft 731. The stabilizing link 737 is not shown in FIG. 10a but lies directly behind the stabilizing link 735.

FIG. 10b is a cross sectional view of the platen actuating mechanism of FIG. 10a taken along lines 10b—10b. In FIG. 10b the forward set of toggles and links are shown. A pair of links 713 extend from fixed pivot points 715 to pivot points on shaft 717. A second set of links 727 extend from shaft 717 to shaft 733. Elements 709 are the cross sectional view of the links extending from shaft 717 to shaft 707. In the center of the view is the end of link 719 which extends from shaft 717 to shaft 725 as shown in FIG. 10a. The platen 701 is shown connected to shaft 733. FIG. 10c is a cross sectional view of the platen actuating mechanism of FIG. 10a taken along the lines 10c—10c. A pair of links 721 extend from fixed pivot points 723 to pivot points on shaft 725. Another pair of links 729 extend from shaft 725 to shaft 731 and the stabilizing arms 735 and 737 are shown on their pivot point around shaft 731.

In the operation of the platen actuating mechanism, rotational movement of the main shaft by the single revolution spring clutch imparts a reciprocating movement to the link 705 because of the eccentric intersection of the main shaft with the pivot shaft by eccentric bearing 703. When, as is shown in FIG. 10a, the main shaft is at its low point the platen 701 will be in its raised position. To lower the platen the main shaft is rotated until its intersection with the eccentric bearing 703 is at the top of the link 705. This reciprocates the link vertically which, since it is linked to shaft 707, will serve to lower the shaft 707. The links 709 and 710 which extend from shaft 707 to shaft 717, will be moved by this reciprocation with the end of the links intersecting shaft 707 being driven down and thus the end of the links intersecting shaft 717 being pulled to the left. This in turns pulls the ends of the links 727 connected to shaft 717 to the left as well as the link 729 because of the link 719 interconnecting pivot shafts 717 and 725. Movement of the links 727 and 729 to the left draws the platen downward because of the action of the pivot shaft 733 and 731. The guide arms 735 and 737 stabilize the movement of the platen as it is reciprocated up and down. The platen 701 is normally in the lowered position but is raised by the platen actuating mechanism when printing is desired.

Figure 10D:
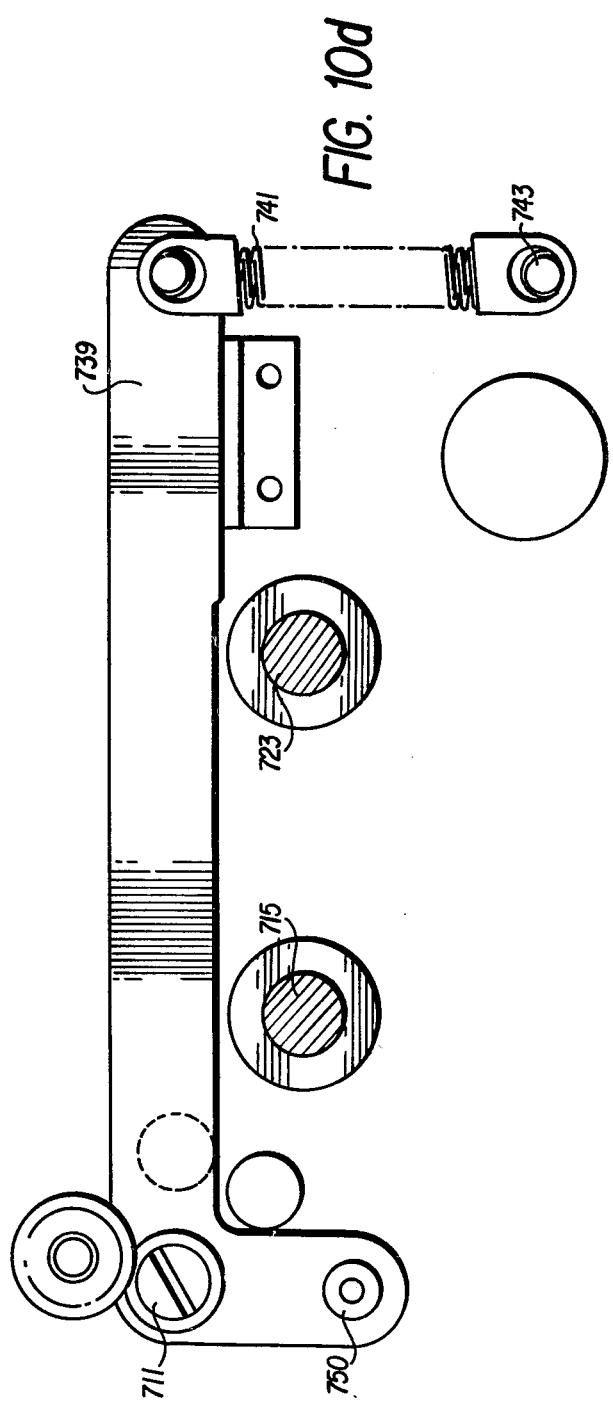

FIG. 10d is a view from the side of the platen actuating mechanism. The view is of the outside of the side plate closest to the single revolution spring clutch within the base portion of a printing module. An overload arm 739 is shown in its normal position. The overload arm 739 is L-shaped with the end of the small leg being attached upon the end of the pivot stud 750 and the intersection of the large leg and the small leg being attached to shaft 711. The overload arm 739 is normally spring biased by a spring 741 attached at one end to the overload arm 739 and at the other end to a spring clamp 743. The overload arm 739 provides a yieldable position for shaft 711 such that any force between platen and print head in excess of the amount determined by the constant of spring 741 will cause shaft 711 to move to the left and thereby decrease the applied platen pressure.

DOCUMENT CONTROL LOGIC

The specification has heretofore discussed in detail the mechanical apparatus for feeding documents from the feeder module into a document transport system, as well as the mechanical apparatus for selectively printing alphabetic information, sequential numeric information and constant numerical information in machine readable and human readable form. The following will be a discussion of the control system which is employed to track a document from the feeder module through each of the printing modules to the document receiving module. As will be seen, the logic employed in the printing modules is identical irrespective of the particular type of printing which is being done by the module.

Figure 11:
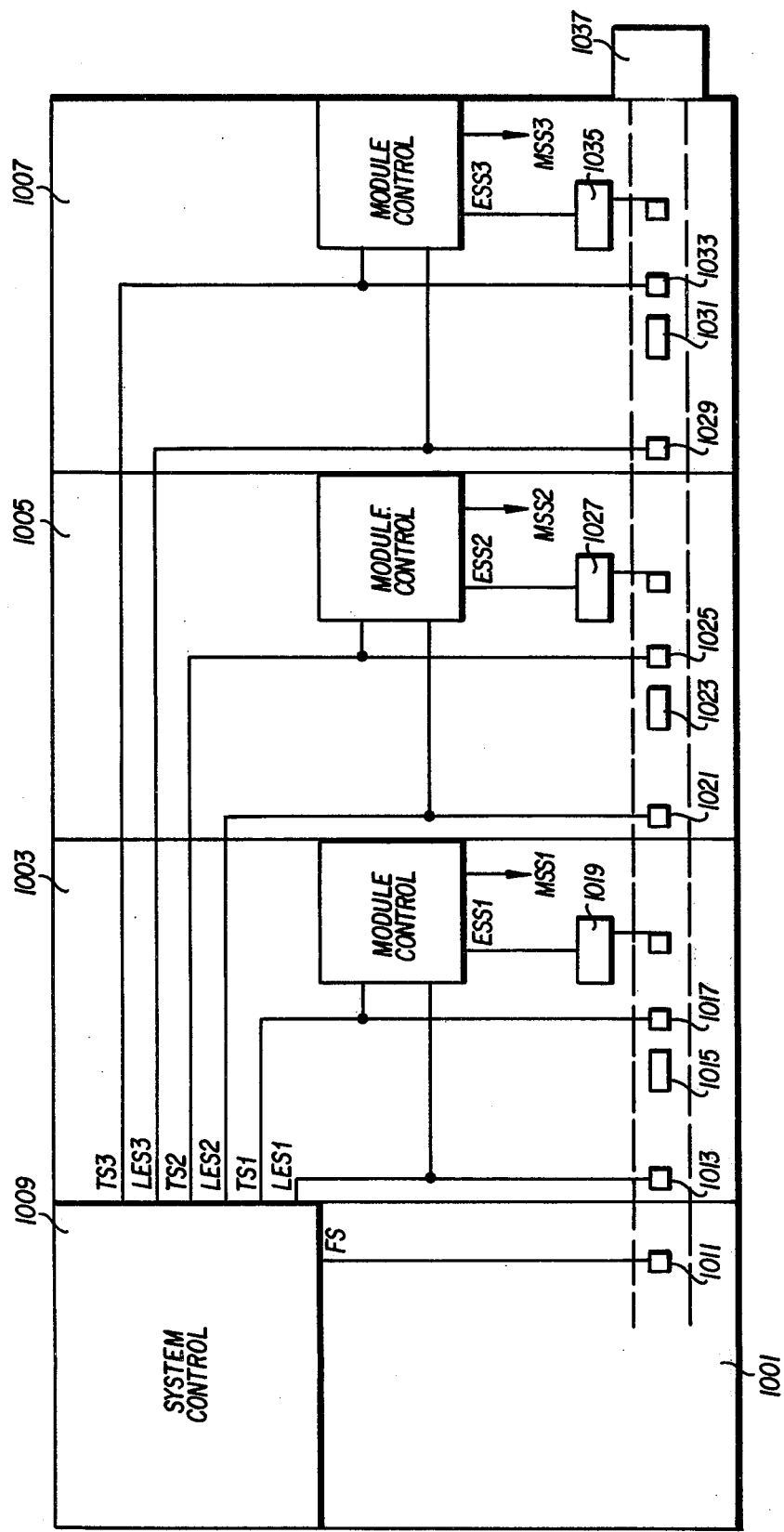
FIG. 11 is a view of the location of position sensors employed by the present invention to track document processed by the system.

FIG. 11 shows diagrammatically the location of the document tracking sensors within the feeder module and the printing modules. FIG. 11 depicts the feeder module 1001 employed to feed the documents into three printing modules, 1003, 1005 and 1007. The feeder module 1001 contains the system module control 1009 and a feed sensor 1011. The feed sensor 1011 could, for example, be a solid state detector which includes in one housing a phototransistor and a light emitting diode. The diode and phototransistor are angularly related such that light from the diode may be reflected to the phototransistor when an item or document is passed over the sensors. This reflection of light back to the phototransistor results in a feed sensor pulse FS passing from the feed sensor 1011 to the control 1009. After a document passes the feed sensor 1011 it enters the document transport system and encounters the first printing module 1003. Along the document path in the module 1003 are lead edge sensor 1013, document printing platen 1015, trip sensor 1017 and end stop 1019. Again, the lead edge sensor 1013 and the trip sensor 1017 can be solid-state detectors in a single housing with a phototransistor and a light emitting diode. The feed sensor 1011, and the lead edge sensors and trip sensors employed in the modules can be of similar construction, and could be replaced by other commonly employed devices. It is important, however, that when a document passes either a lead edge sensor 1013 or a trip sensor 1017 that a pulse be generated to reflect that fact. In module 1003, the lead edge sensor 1013 supplies a lead edge sensor pulse LES1 to the control system 1009 and to the module control system. The module control system includes apparatus for actuating the solenoid in the end stop 1019 to rotate the end stop arm into the document path upon receiving an LES1 signal from lead edge sensor 1013. The solenoid is actuated by an ESS1 pulse. After an appropriate delay which is sufficient to permit the document which passed over lead edge sensor 1013 to come to a stop at the barrier caused by the end stop arm in the document feed path, the module control system generates a MSS1 pulse to cause the spring clutch to initiate a single rotation of the main shaft in the module 1003 to actuate the platen 1015 through a printing cycle to thereby print on the document in the module. The mechanical components for vertically reciprocating the platen in cooperation with a print head have been previously described. After printing, the module control causes the end stop 1019 to raise the end stop arm and permit the document to be transported to the next module. If a printing module is in the bypass mode, the module control system will permit a document to pass through the module without interference by the end stop and it will also inhibit revolution of the main shaft in the module to be bypassed. The trip sensor 1017 generates a trip sensor pulse TS1 to the control system 1009 and to the module control and signals that a document has passed without difficulty from the lead edge sensor 1013 to the trip sensor 1017. As will be hereinafter discussed, the control system 1009 chronologically monitors the occurrences of the lead edge sensor pulses and the trip sensor pulses to determine if they occurred in a proper sequence and whether there has been a failure in the document transport system. Module 1005 is representative of a second printing module interconnected with the printing module 1003 and the feeder module 1001. Module 1005 contains a lead edge sensor 1021, a platen 1023, a trip sensor 1025 and an end stop 1027, all in the document path. The document passing over the lead edge sensor 1021 and the trip sensor 1025 will respectively generate a lead edge sensor pulse LES2 and a trip sensor pulse TS2. Module 1007 also includes a lead edge sensor 1029, a platen 1031, a trip sensor 1033 and the end stop 1035. The lead edge sensor 1029 generates a lead edge sensor pulse LES3 upon the passage of a document and the trip sensor 1033 generates a trip sensor pulse TS3 when a document passes over it. FIG. 11 shows only three printing modules 1003, 1005 and 1007 connected before a document reaches the document receiving hopper 1037. It should be understood, however, that fewer than three or more than three modules can be interconnected to form a modular printing system with a feeder module. For the sake of explanation only three printing modules have been shown in FIG. 11.

Figure 12:
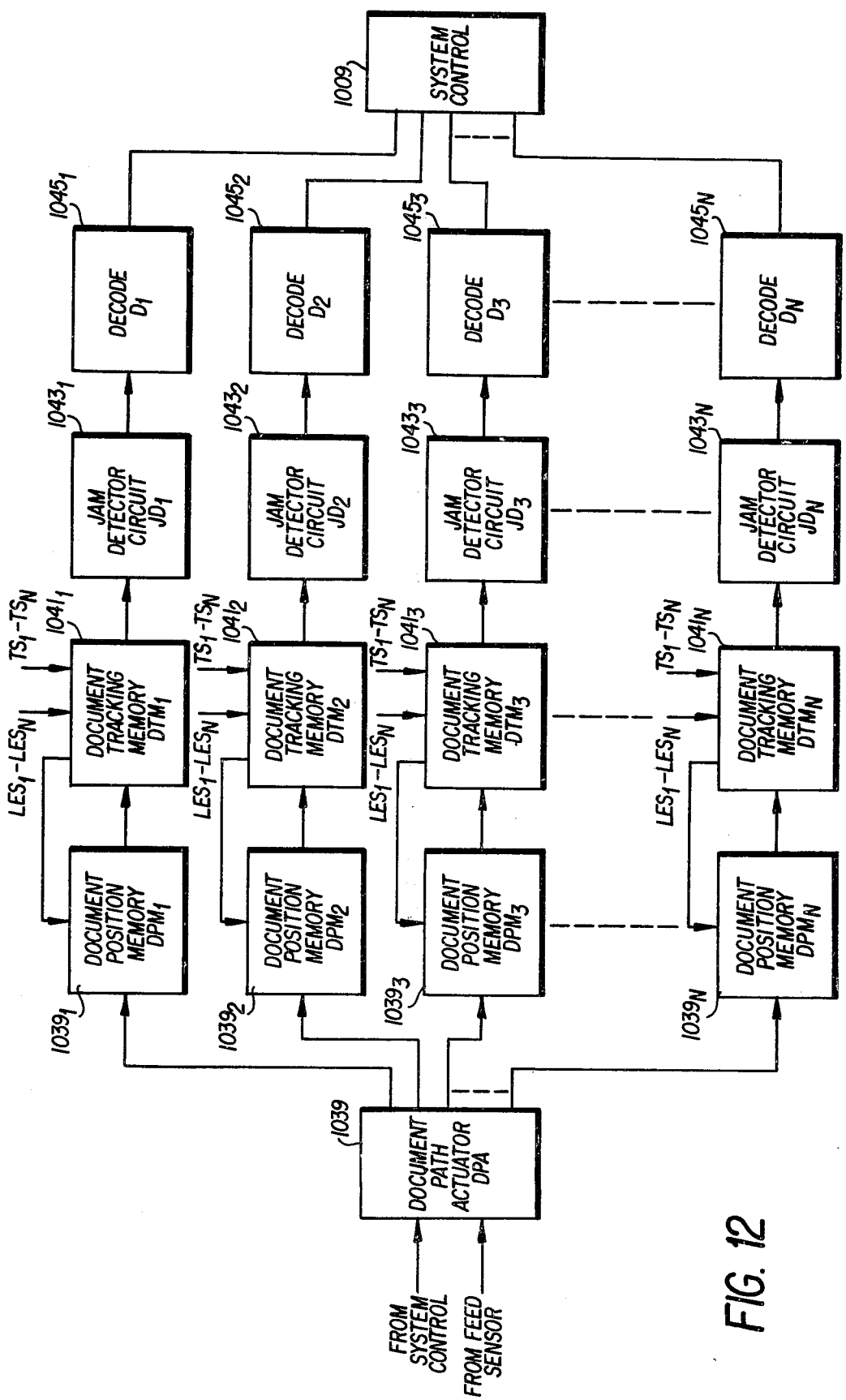
FIG. 12 is a block diagram depicting the logic flow of the document tracking system of the present invention.

FIG. 12 shows in block diagram form the logic employed in tracking a single document or a plurality of documents from the feeder module through the printing modules to the document receiving hopper. Within the control system 1009 is a document path actuator (DPA) 1039. The DPA receives the feed sensor signal FS from the feeder module 1001 and other control system signals from the control module 1009. Since the modular printing system permits more than one document to be within the combined document transport systems of all the printing modules at one time, it is necessary to provide logic to monitor the status of each document fed from the feeder module as it passes through the various printing modules. Each FS pulse activates a document path. A document path corresponds to a logic monitoring system for tracking a document through the printing modules. Each document path includes a document position memory (DPM), a document tracking memory (DTM), a jam detector circuit (JD), a decode circuit (D) and an output to the system control 1009. As shown in FIG. 12 document path 1 includes a DPM1, 1039$_1$; DTM1, 1041$_1$; JD1, 1043$_1$; and D1, 1045$_1$. When a document is fed from the feeder module the feed sensor signal FS enters the DPA 1039 which selects an appropriate document path. The document path actuator 1039 includes a shift register which receives a an input from the feed sensor. For the first document entered into the transport system an entry is made into the first position of the shift register and document path 1 is thereby actuated. Subsequent documents fed from the feeder module and supplying feed sensor pulses to the document path actuator will cause additional entries in the shift register in the DPA and will in turn actuate additional document paths. When document path 1 is actuated an entry is made in the document position memory DPM1 indicating that the document is to be monitored as it passes through the printing modules. The document position memory employs a shift register and when the document path is actuated an entry is made in the first position of that shift register, and the document tracking memory is thereby activated. The document tracking memory receives inputs from the lead edge sensors and the trip sensors of all the modules. The document tracking memory correlates the inputs from the lead edge sensors and the trip sensors with the position of the document within the document path. The jam detector circuit determines whether a document is sequentially moving through the printing modules within certain time constraints. In other words, the jam detector circuit accepts inputs from the lead edge sensors and the trip sensors of the modules and determines if these signals are coming in within permissible time periods and in the proper sequence. The jam detector circuit in each document path is reset and retriggered every time a document hits a lead edge or trip sensor by the resultant LES or TS pulse. After reset, the jam detector circuit begins a new timing sequence to determine whether the document hits the next lead edge sensor or trip sensor within the permissible time limit. If the jam detector circuit determines that there has been a jam in any of the printing modules because a LES pulse or TS pulse was not forthcoming it supplies an input to the decode circuit within the document path which correlates the position of the document with the occurrence of a jam and signals the system control that a malfunction has occurred and then signals a sequenced shutdown of the machine which permits all documents ahead of the jam to be processed normally.

FIGS. 13$a$ and 13$b$ depict the logical elements which may be employed to comprise a document path. The elements which comprise a document position memory, a document tracking memory, a jam detector circuit and a decoder are indicated by dotted lines in FIG. 13$a$. Assuming that the feed sensor has indicated that a document has just been fed into the document transport system the document path actuator selects the document path. If this is the first document then document path 1 (DP$_1$) will be selected. A pulse is sent down line 1049 to NAND gate 1051. The pulse passes through NAND gate 1051 to inverter 1053 where it is passed to both the shift register 1055 and the logic gate 1059. The pulse passing through shift register 1055 is returned to flip-flop 1057 and through the Q output to shut off NAND gate 1051. At this point the document has not hit the lead edge sensor of the first module and the state of the elements include an entry in shift register 1055 and an entry in logic gate 1059. Upon passing the lead edge sensor of the first module a pulse is entered into logic gate 1059 over lead ES1 which causes the shift register to step one position, outputting the pulse on the line 1060 to shift the entry in shift register 1055 to the next position which in turn shifts the entry in logic gate 1059 to its subsequent position. At the time logic gate 1059 is stepped, an output is generated to OR gate 1061 and one-shot 1063. The oneshot 1063 has been previously cleared from the pulse coming from logic gate 1059 through flip-flop 1071. The one-shot 1063 is counted up by an oscillator connected at 1065 and if trip sensor 1 is not encountered before the one-shot times out, Q in 1063 outputs to flip-flop 1073 which passes an output to the decoder circuit D-1. If, however, strip sensor 1 is encountered by the document before the one-shot 1063 times out a signal is presented at TS-1 of logic gate 1059. Again, a pulse is put over line 1060 to shift the shift register 1055 one position which indicates that the next input which should be received is a pulse from the lead edge sensor of module 2. Simultaneously, with the pulse out line 1060, another pulse is provided over line 1062 to flip-flop 1071. This clocks the flip-flop causing a reset pulse to be sent out to reset the one-shot 1063 and prevent it from timing out and indicating that an error has occurred. Also, the first switch in 1067 is closed upon the shift register 1055 indicating that a trip sensor signal is expected. The switches in 1067 correspond to the number of modules in the printing system. When all the switches are closed NAND gate 1069 supplies an input to flip-flop 1071 such that flip-flop 1073 is reset and the shift register 1055 is reset indicating that the document has passed all the sensors in the printing modules and is being delivered to the output hopper. The decoder circuit 1075 accepts inputs from the lead edge sensors and the trip sensors as well as a jam signal from the jam detector circuit. The decode circuit 1075 correlates the signals from the sensors and the jam indicating signal to indicate to the control system in which module a jam has occurred. Upon the occurrence of a jam the control system actuates the end stops in the module where the jam occurred as well as any modules between the jammed module and the feeder module to place the end stop arms into the lowered position and stop any documents within those modules. The control system does not, however, actuate the end stops of any modules which lie between the jammed module and the output hopper, but lets the documents be processed within those modules in the normal fashion.

Figure 13B:
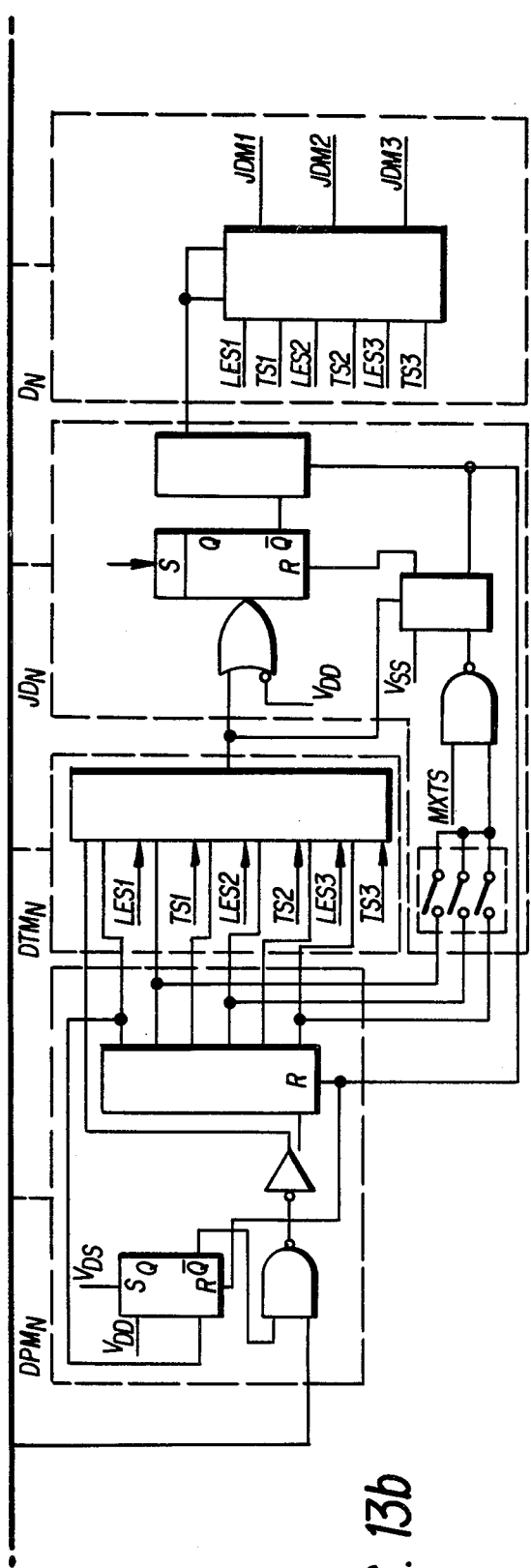
FIG. 13a-13b show an embodiment of the logic employed by the document tracking system of the present invention.
Figure 13A:
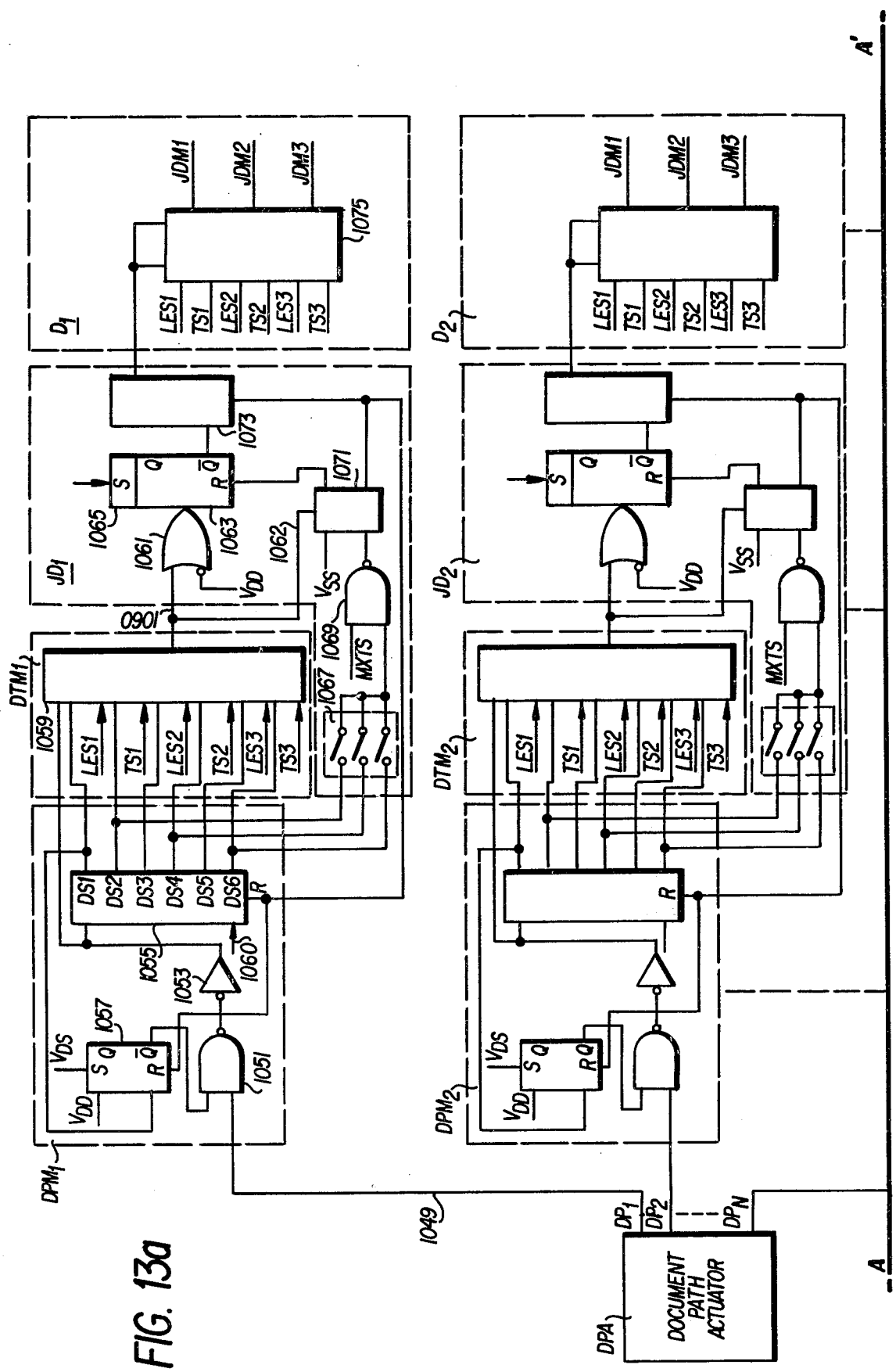

FIGS. 13a and 13b depict document paths $DP_2$ and $DP_n$. These document paths function in the same manner as $DP_1$ and will not be further discussed. It should be noted, however, that to maximize the document processing speed, the control system permits the feeder to feed enough documents into the document transport system such that documents will reside in each of the printing modules and a document will also be in transit between each of the printing modules. Thus, the number of document path circuits as depicted in FIGS. 13a and 13b which must be provided is directly related to the number of document printing modules employed by the system.

Figure 14B:
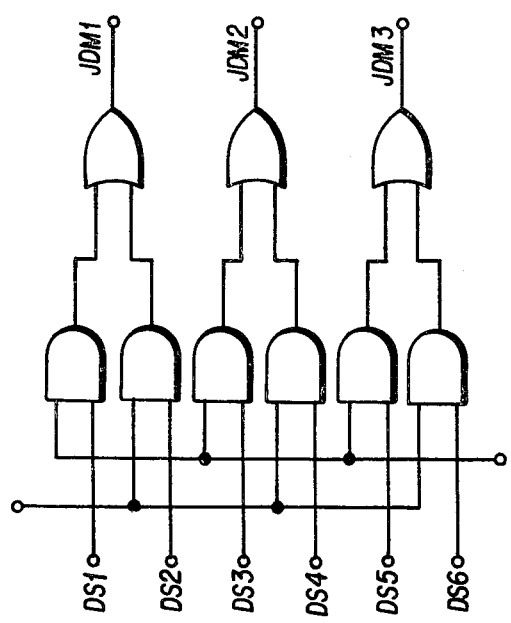
FIGS. 14a and 14b are diagrams of logic devices employed in the document tracking system of the present invention.
Figure 14A:
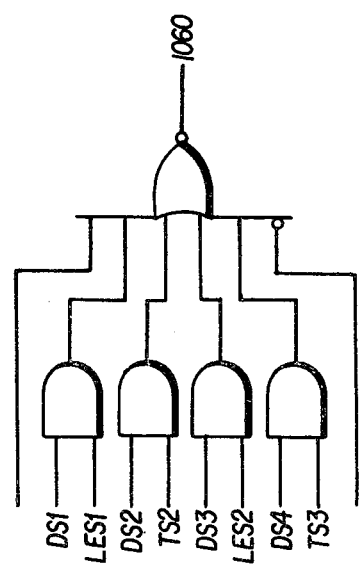

FIG. 14a is provided as an example of the configuration of logic gates which comprise the logic gate 1059 in the document tracking memory modules. FIG. 14b is an example of the logic gate configuration of the decode circuit 1075 of the decode module.

The foregoing description of mechanical apparatus and logical control apparatus are intended to be explanatory of a modular high speed printing apparatus for printing alphabetic and numeric information upon individual items or documents in both machine readable and human readable form. It will be understood from the foregoing that various changes may be made in the preferred embodiment illustrated herein, and it is intended that the foregoing material be taken as illustrative only, and not in a limiting sense, and that scope of the invention is defined by the following claims.

What is claimed is:

1. A high-speed document printing system segmented into modular functional units, said system comprising:
   A. a document feeder module;
   B. at least one document printing module coupled to said feeder module for printing documents fed therefrom;
   C. a document receiver module coupled to said printer module for receiving said printed documents; and
   D. system control means commonly associated with all of said modules;
   E. said document printing module comprising:
      1. a document transport means forming a document path for serially transporting documents through said printing module;
      2. a document print head positioned above said document path for printing on said documents;
      3. vertically reciprocatable platen means positioned in said document path and opposite said print head for supporting individual documents thereon and for raising said supported documents into contact with said print head;
      4. inked ribbon means interposed between said document and said print head and adapted to transfer ink to said document when they are raised by said platen means to contact said print head;
      5. adjustable actuatable means for arresting the transport of documents through said document path by adjustably stopping said documents on said platen means beneath said print head; and
      6. transducer means positioned in said document path for sensing the passage of documents and for providing document position signals indicating such passage;
   F. said system control means comprising:
      1. means for receiving said document position signals from said transducer means;
      2. means for actuating said adjustable actuatable means in response to said document position signals;
      3. means for reciprocating said platen means in response to said document position signals to effect printing on documents supported by said platen means; and
      4. means for monitoring the transport of documents from said feeder module through said document path to said receiving module and for detecting document jams therein;
   G. said document feeder module comprising:
      1. a document hopper for storing documents to be fed by said feeder module;
      2. low-speed feed means for drawing documents out of said document hopper at a slow first speed so that said documents are not torn during such feeding;
      3. document feed path means for receiving documents fed from said document hopper by said low-speed feed means;
      4. high-speed feed means, mounted in said document feed path means, for accelerating from said slow first speed to a second, substantially-higher second speed, the documents in said feed path means;

5. exit means, communicating with said high-speed feed means, for passing said accelerated documents out of said feeder module and into said document transport means;

whereby high-speed feeding of documents from said document feeder module into said document transport means is achieved without tearing said documents.

2. The modular high-speed printing system of claim 1 wherein said document transport means comprises a plurality of rotatable drive pulleys positioned along said document path for tangentially contacting documents in said document path to accelerate said document through said document transport means upon rotation of said drive pulleys, and means positioned above said drive pulleys to bias documents in said document path into driving contact with said drive pulleys.

3. The modular high-speed document printing system of claim 1 wherein said document print head comprises:
   a plurality of numerical character dies rotatably mounted on an axle;
   key selector means for rotating said character dies to select a number to be printed on documents by said print head; and
   means for further rotating said character dies during the printing of a document to change the number to be printed on the next document.

4. The modular high-speed document printing system of claim 3 wherein said document print head further includes control means for placing said print head into one of two operating modes, said first mode comprising the active mode for printing on documents positioned on said platen means beneath said print head and said second mode comprising a bypass mode whereby said print head does not print on said documents.

5. The modular high-speed printing system of claim 4 wherein said print head further includes means for selectively adjusting the print position of said print head to print at any desired location across the width of said documents and transverse to said document path.

6. The modular high-speed printing system of claim 1 wherein said adjustable actuatable means further includes means for adjustably positioning printing along the length of said documents.

7. A modularly-segmented high-speed document printing system for processing similar or dissimilar documents, and for printing, in a single pass of documents through the system, numerous, mutually-distinct, independently-adjustable, and individually-controllable information fields, said system comprising:
   A. a feeder module for feeding a succession of documents, said feeder module having a feed sensor for sensing the feeding of said documents and for providing a feed sensor signal indicative thereof;
   B. at least one document format-adjustable printing module comprising:
      1. document transport means forming a document path for receiving documents fed by said feeder module and for transporting said documents through said printing module;
      2. print head means disposed above said document path for printing on said documents;
      3. vertically reciprocatable platen means disposed below said document path and opposite said print head for supporting documents thereon and for raising said supported documents into contact with said print head means;
      4. ribbon means interposed between said print head and said document path and adapted to transfer ink to said documents when said documents are raised by said platen means to contact said print head;
      5. actuatable clutch means for reciprocating said platen means;
      6. actuatable document stop means in said document path for adjustably positioning said documents on said platen means;
      7. transducer means in said document path for sensing the documents transported past said transducer means for generating document position signals indicative thereof;
   C. document receiving means for receiving documents from said document transport means after printing; and
   D. system control means receiving said feed sensor signals and said document position signals and monitoring the transfer of documents from said feeder module through said printing module to said document receiver means, said system control means providing appropriate actuating signals to said document stop means and said clutch means to accomplish printing on said documents;
   E. said feeder module further comprising:
      1. a document hopper for storing documents to be fed by said feeder module;
      2. low speed feed means for drawing documents out of said document hopper at a slow first speed so that said documents are not torn during such feeding;
      3. document feed path means for receiving documents fed from said document hopper by said low speed feed means;
      4. high-speed feed means, mounted in said document feed path means, for accelerating, from said slow first speed to a second, substantially-higher second speed, the documents in said feed path means;
      5. exit means, communicating with said high-speed feed means, for passing said accelerated documents out of said feeder module and into said document transport means;
      whereby high-speed feeding of documents from said document feeder module into said document transport means is achieved without tearing said documents.

8. A modular high-speed document printing system comprising:
   A. a document feeder module;
   B. at least one document printing module coupled to said feeder module for printing documents fed therefrom;
   C. a document receiver module coupled to said printer module for receiving said printed documents; and
   D. system control means commonly associated with all of said modules;
   E. said document printing module comprising: p2 1. a document transport means forming a document path for serially transporting documents through said printing module;
      2. a document print head positioned above said document path for printing on said documents;
      3. vertically reciprocatable platen means positioned in said document path and opposite said print head for supporting individual documents thereon and for raising said supported documents into contact with said print head;
4. inked ribbon means interposed between said document and said print head and adapted to transfer ink to said document when they are raised by said platen means to contact said print head;
5. adjustable actuatable means for arresting the transport of documents through said document path by adjustably stopping said documents on said platen means beneath said print head; and
6. transducer means positioned in said document path for sensing the passage of documents and for providing document position signals indicating such passage;

F. said system control means comprising:
1. means for receiving said document position signals from said transducer means;
2. means for actuating said adjustable actuatable means in response to said document position signals;
3. means for reciprocating said platen means in response to said document position signals to effect printing on documents supported by said platen means; and
4. means for monitoring the transport of documents from said feeder module through said document path to said receiving module and for detecting document jams therein;

G. said document feeder module comprising:
1. a document hopper for storing documents to be fed by said feeder module, said hopper including adjustable wall means for opening and closing said hopper to accommodate documents of different widths; p2 2. state-selection means, connected to said system control means, for supplying a signal which causes said feeder module to be placed into a continuous-feed state or a single-feed state;
3. a primary feeder means, communicating with said document hopper and responsive to said system control means, for feeding documents from said hopper when said feeder module is in its continuous-feed state;
4. exit means, communicating with said primary feeder means, for passing documents from said feeder means out of said feeder module and into said document transport means;
5. a secondary feeder means, communicating with said exit means and responsive to said system control means, for singly feeding documents when said feeder module is in its single-feed state;
6. a feed sensor, connected to said system control means and responsive to the passage of documents through said exit means, said feed sensor for supplying to said control means a signal corresponding to the feeding of each document by said feeder module; p2 7. counting means, connected to said system control means and responsive to said feed sensor signal, for accumulating the number of documents fed by said feeder module;
8. run selector means, connected to said system control means, for selecting the number of documents to be sequentially fed by said feeder module, and for supplying to said control means a signal corresponding to this selected document number, said system control means inhibiting the further feeding of documents when the number of fed documents in a given set reaches said selected document number.

9. The modular high-speed printing system of claim 7 wherein:
said document hopper has a fixed wall parallel to said adjustable wall means, said hopper adapted to retain documents between said fixed wall and said adjustable wall means; and
said means for opening and closing said document hopper comprises a parallelogram hinge.

10. The modular high-speed printing system of claim 9 wherein said parallelogram hinge comprises:
an elongated central member disposed parallel to said movable wall and positioned on the opposite side of said movable wall with respect to said fixed wall;
a first set of arms, each of said first set of arms flexibly connected at one end to one side of said central member and connected at its other end to said movable wall;
a second set of arms, each of said second set of arms flexibly connected at one end to the opposite side of said central member and fixedly connected at its other end to said feeder;
means for extending said arms perpendicularly to said central member to close said forms hopper; and
means in opposition to said extending means to decrease the angle between each of said arms and said central member to thereby open said forms hopper.

11. The high-speed modular printing system of claim 10 wherein said means for extending said arms comprises a spring axially aligned with said central member and fixedly connected at one end to said feeder module and connected at its other end to said central member.

12. The high-speed modular printing system of claim 10 wherein said means in opposition to said extending means comprises:
a rotatable axle mounted on said feeder module and a cord connected at one end to said rotatable axle and at its other end to said movable wall such that rotation of said rotatable axle in one direction winds the cord about said rotatable axle to open said document hopper and, conversely, rotation of said rotatable axle in the opposite direction unwinds the cord from said rotatable axle and permits the spring to close said document hopper.

13. The modular high-speed document printing system of claim 8 wherein said secondary document feeder means includes a document guide channel for guiding documents inserted therein and a rotatable document aligning roller skewed with respect to said document channel and adapted to engage and align documents inserted into said document channel.

14. A modular high-speed document printing system comprising:
A. document feeder module;
B. at least one document printing module coupled to said feeder module for printing documents fed therefrom;
C. a document receiver module coupled to said printer module for receiving said printed documents; and
D. system control means commonly associated with all of said modules;
E. said document printing module comprising:

1. a document transport means forming a document path for serially transporting documents through said printing module;
2. a document print head positioned above said document path for printing on said document;
3. vertically reciprocatable platen means positioned in said document path and opposite said print head for supporting individual documents thereon and for raising said supported documents into contact with said print head;
4. inked ribbon means interposed between said document and said print head and adapted to transfer ink to said documents when they are raised by said platen means to contact said print head;
5. adjustable actuatable means for arresting the transport of documents through said document path by adjustably stopping said documents on said platen means beneath said print head; and
6. transducer means positioned in said document path for sensing the passage of documents and for providing document position signals indicating such passage;

F. said document transport means comprising:
1. a plurality of rotatable drive pulleys positioned along said document path for tangentially contacting documents in said document path to accelerate said document through said document transport means upon rotation of said drive pulleys; and
2. means positioned above said drive pulleys to bias documents in said document path into driving contact with said drive pulleys;

G. said document print head comprising:
1. a plurality of numerical character dies rotatably mounted on an axle;
2. key selector means for rotating said character dies to select a number to be printed on documents by said print head; and
3. means for further rotating said character dies during the printing of a document to change the number to be printed on the next document;

H. said document print head further including: print means for placing said print head into one of two operating modes, said first mode comprising the active mode for printing on documents positioned on said platen means beneath said print head, and said second mode comprising a bypass mode whereby said print head does not print on said documents;

I. said print head further including means for selectively adjusting the print position of said print head to print at any desired location across the width of said documents and transverse to said document path;

J. said adjustable actuatable means further including means for adjustably positioning printing along the length of said documents;

K. said means for adjustably positioning printing along the length of said documents comprising:
1. a rotatable shaft;
2. an actuatable solenoid coupled to said rotatable shaft for rotating said shaft upon said actuation of said solenoid;
3. a stop arm attached to said rotatable shaft for pivoting about the axis of said rotatable shaft upon actuation of said solenoid, said stop arm having a document engaging end rotatably positioned in said document path upon actuation of said solenoid for abutting documents traveling in said document path to arrest the movement thereof; and
4. guide means for adjustably supporting said actuatable solenoid along said document path, whereby said coupled rotatable shaft, said attached stop arm, and said document engaging end are also adjustably positioned along said document path.

* * * * *

UNITED STATES PATENT AND TRADEMARK OFFICE
CERTIFICATE OF CORRECTION

PATENT NO. : 4,197,797
DATED : April 15, 1980
INVENTOR(S) : Rayfield, et al

It is certified that error appears in the above—identified patent and that said Letters Patent is hereby corrected as shown below:

In the Specification

Col. 18, line 55, change "Q" to -- $\overline{Q}$ --.

Col. 18, line 61, change "ES1" to LES1 --.

Col. 19, line 4, change "Q" to -- $\overline{Q}$ --.

In the Claims

Claim 8, column 22, line 60, delete "p2".

Signed and Sealed this

Fifteenth Day of September 1981

[SEAL]

Attest:

Attesting Officer

GERALD J. MOSSINGHOFF

Commissioner of Patents and Trademarks